(12) United States Patent
Tripathi et al.

(10) Patent No.: US 8,767,752 B1
(45) Date of Patent: Jul. 1, 2014

(54) METHOD AND SYSTEM FOR RESOURCE COHERENCY AND ANALYSIS IN A NETWORK

(75) Inventors: Sunay Tripathi, Palo Alto, CA (US); Robert James Drost, Los Altos, CA (US); Garima Tripathi, Palo Alto, CA (US)

(73) Assignee: Pluribus Networks, Inc., Palo Alto, CA (US)

( * ) Notice: Subject to any disclaimer, the term of this patent is extended or adjusted under 35 U.S.C. 154(b) by 352 days.

(21) Appl. No.: 13/099,918

(22) Filed: May 3, 2011

Related U.S. Application Data

(60) Provisional application No. 61/330,758, filed on May 3, 2010, provisional application No. 61/346,411, filed on May 19, 2010, provisional application No. 61/346,147, filed on May 19, 2010.

(51) Int. Cl.
 *H04L 12/28* (2006.01)
(52) U.S. Cl.
 USPC .......................................................... 370/401
(58) Field of Classification Search
 USPC .......................................................... 370/401
 See application file for complete search history.

(56) References Cited

U.S. PATENT DOCUMENTS

| | | | | |
|---|---|---|---|---|
| 7,830,793 | B2 * | 11/2010 | Gai et al. ....................... | 370/230 |
| 8,274,896 | B2 * | 9/2012 | Lakshmikantha et al. . | 370/235.1 |
| 8,284,692 | B2 * | 10/2012 | Arye .............................. | 370/252 |
| 8,424,005 | B2 * | 4/2013 | Strom et al. ................... | 718/102 |
| 8,451,854 | B1 * | 5/2013 | Sayrafian-Pour ............. | 370/419 |
| 8,451,867 | B2 * | 5/2013 | Dowd ........................... | 370/503 |

FOREIGN PATENT DOCUMENTS

WO 2006/124414 A2 11/2006

* cited by examiner

*Primary Examiner* — Chandrahas Patel
(74) *Attorney, Agent, or Firm* — Martine Penilla Group, LLP

(57) ABSTRACT

A system that includes a switch fabric and a resource coherency and analytics engine (RCAE). The RCAE includes a virtual traffic shaper (VTS). The VTS includes virtual output queues (VOQs), where each VOQ is associated with a virtualizable resource group (VRG)-OP pair. The VTS includes functionality to receive a first packet, make a first determination that the first packet is to be sent to a first OP, make a second determination that the first packet is associated with a first VRG, and store, based on the first and second determinations, the first packet in a VOQ associated with a first VRG-OP pair. The VTS also includes functionality to schedule the first packet for transmission from the VOQ to the switch fabric.

21 Claims, 15 Drawing Sheets

METHOD AND SYSTEM FOR RESOURCE COHERENCY AND ANALYSIS IN A NETWORK

CROSS-REFERENCE TO RELATED APPLICATIONS

This application claims benefit under 35 U.S.C. §119(e) to U.S. Provisional Application Ser. No. 61/330,758 entitled "VIRTUAL NETWORKS" filed on May 3, 2010. U.S. Provisional Application Ser. No. 61/330,758 is hereby incorporated by referenced in its entirety.

This application claims benefit under 35 U.S.C. §119(e) to U.S. Provisional Application Ser. No. 61/364,147 entitled "VIRTUAL NETWORKS" filed on May 19, 2010. U.S. Provisional Application Ser. No. 61/134,147 is hereby incorporated by referenced in its entirety.

This application claims benefit under 35 U.S.C. §119(e) to U.S. Provisional Application Ser. No. 61/346,411 entitled "VIRTUAL NETWORKS" filed on May 19, 2010. U.S. Provisional Application Ser. No. 61/346,411 is hereby incorporated by referenced in its entirety.

BACKGROUND

Network devices transmit data within or between networks. Network devices such as switches and routers have limited functionality to monitor the flow of packets in a network. As a result of this limited functionality, switches and routers have a limited ability to control and manage the flow of packets through a network.

SUMMARY

In general, in one aspect, the invention relate to a system. The system includes a switch fabric comprising a plurality of output ports (OPs), a resource coherency and analytics engine (RCAE) comprising a virtual traffic shaper (VTS), wherein the RCAE is operatively connected to the switch fabric, wherein the VTS comprises a plurality of virtual output queues (VOQs), wherein each VOQ is associated with a virtualizable resource group (VRG)-OP pair, wherein each OP is one of the plurality of OPs and wherein each VRG is one of a plurality of VRGs. The VTS is configured to receive a first packet, make a first determination that the first packet is to be sent to a first OP of the plurality of OPs, make a second determination that the first packet is associated with a first VRG of a plurality of VRGs, store, based on the first and second determinations, the first packet in a VOQ associated with a first VRG-OP pair corresponding to the first VRG and the first OP, wherein the VOQ is one of the plurality of VOQs, and schedule the first packet for transmission from the VOQ to the switch fabric.

In general, in one aspect, the invention relates to a network device. The network device includes a switch fabric comprising a plurality of output ports (OPs), a resource coherency and analytics engine (RCAE) comprising, a plurality of input ports each configured to receive packets, a plurality of virtual traffic shapers (VTSs) each associated with one of the plurality of input ports, wherein each of the plurality of VTSs comprises a plurality of virtual output queues (VOQs), wherein each VOQ is associated with a virtualizable resource group (VRG)-OP pair, wherein each OP is one of the plurality of OPs and wherein each VRG is one of a plurality of VRGs, a vResource Snooper configured to obtain RCAE statistics from each of the plurality of VTSs, a vCoherency Controller configured to obtain the RCAE statistics from the vResource Snooper and set VTS operating parameters based on the RCAE statistics, a vResource Policy Feedback Module configured to obtain the VTS operating parameters from the vCoherency controller and provide the VTS operating parameters to at least one of the plurality of VTSs.

In general, in one aspect, the invention relates to a network device. The network device includes a switch fabric comprising a plurality of output ports (OPs), a resource coherency and analytics engine (RCAE) comprising a first input port, a first Virtual Traffic Shaper (VTS) comprising a first virtual output queue (VOQ) associated with a first virtualizable resource group (VRG)-OP pair corresponding to a first VRG and a first OP, wherein the first VOQ is configured to receive packets from the first input port, a first VOQ drainer is associated with a first drain rate, wherein the first drain rate specifies a rate at which packets in the first VOQ are scheduled for transmission to the switch fabric, and wherein the first VOQ drainer is configured to schedule a first packet in the first VOQ for transmission based on the first drain rate, a vCoherency Controller configured to obtain RCAE statistics from the first VTS and update the first drain rate to obtain an updated first drain rate using the RCAE statistics obtained from the first VTS, and wherein the RCAE is configured to provide the first VOQ drainer with the updated first drain rate.

In general, in one aspect, the invention relates to a system. The system includes a first switch comprising a first resource coherency and analytics engine (RCAE), a second switch comprising a second RCAE, wherein the second switch is configured to receive packets from a host operatively connected to the second switch, wherein the second switch is configured to send the packets to the first switch, wherein the first RCAE is configured to determine that a virtual output queue (VOQ) in a virtual traffic shaper (VTS) on the first RCAE has exceeded a bandwidth notification threshold, wherein the VOQ is associated with a virtualizable resource group (VRG) and an output port on the first switch, wherein the packets are received at an input port of the first RCAE, and wherein the VTS is configured to obtain the packets from the input port, issue, based on the notification, a bandwidth control message (BCM) to the second RCAE, wherein the second RCAE is configured to receive the BCM, update, based on the BCM, at least one virtual traffic shaper in the second RCAE to issue the packets to the input port on the first RCAE at a lower rate.

Other aspects of the invention will be apparent from the following description and the appended claims.

BRIEF DESCRIPTION OF DRAWINGS

FIGS. 8A-11C show examples in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-11C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a resource coherency and analytics engine (RCAE) that is configured to monitor and manage the flow of packets in a network device. In one embodiment of the invention, the RCAE uses virtual traffic shapers (VTSs) to monitor and manage the flow of packets in the network device.

In one embodiment of the invention, a network device is any physical device connected to a network that includes functionality to receive packets from one network entity and send packets to another network entity. Examples of network devices include, but are not limited to, single-layer switches, multi-layer switches, and routers. Network entities correspond to any virtual or physical device on a network that is configured to receive packets and send packets. Examples of network entities include, but are not limited to, network devices (defined above), virtual machines, host operating systems natively executing on a physical device, and virtual network appliances (e.g., virtual switch, virtual router), physical network appliances (e.g., firewall appliance).

Figure 1:
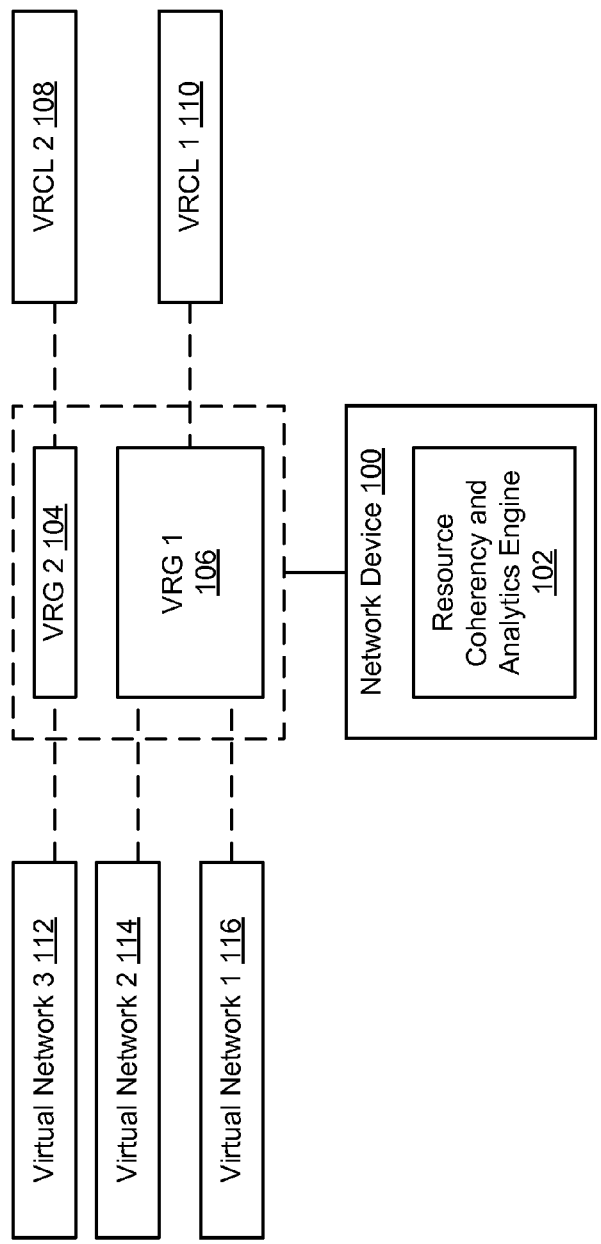
FIG. 1 shows a diagram relating the various components in a system in accordance with one or more embodiments of the invention.

FIG. 1 shows a diagram relating the various components in the system in accordance with one or more embodiments of the invention. The system includes a network device (100), a RCAE (102) on the network device, one or more virtualizable resource groups (VRGs) (e.g., 104, 106), one or more virtualizable control lists (VRCLs) (e.g., 108, 110), and one or more virtual networks (e.g., 112, 114, 116). Each of these components is described below.

In one embodiment of the invention, the network device (100) includes a switch fabric (not shown). The switch fabric may be implemented using packet switching, circuit switching, another type of switching, or any combination thereof. The RCAE (102) may be implemented using any combination of hardware, firmware, and/or software. With respect to the hardware, the RCAE may be implemented using any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof. Additional details of the RCAE may be found in FIGS. 2A-2C. Those skilled in the art will appreciate that while FIG. 1 only shows a single RCAE on the network device, a given network device may include multiple RCAEs.

In one embodiment of the invention, a VRG is a listing of network entities (defined above), flows (e.g., a transmission control protocol (TCP) flow, a user datagram protocol (UDP) flow, an internet control message protocol (ICMP) flow, etc), and/or other VRGs (i.e., VRGs may be nested). Those skilled in the art will appreciate that a VRG may be implemented using any type of known data structure. The elements in the VRG (e.g., network entities, flows, other VRGs) may be identified using one or more of the following: a VRG name, a media access control (MAC) address, MAC type (for non-IP packets), IP type (e.g., TCP, UDP, etc.), OSI layer 4 information related to TCP ports, IPSec security associations (SA), a virtual local area network (VLAN) tag, a 802.1Q VLAN tag, a 802.1Q-in-Q VLAN tag, an internet protocol (IP) address. The elements associated with a given VRG may be identified using other means not included above without departing from the invention.

In one embodiment of the invention, a virtual network is a logical grouping of two or more network entities. In one embodiment of the invention, each VRG may be associated with one or more virtual networks. In one embodiment of the invention, the network entities may be associated with a virtual network and, in turn, the virtual network may be associated with the VRG. Once the virtual network is associated with a VRG, the network entities in the virtual network become elements of the VRG. In one embodiment of the invention, the VRG may only list the virtual network name as an element of the VRG instead of the listing the individual network entities in the virtual network.

In one embodiment of the invention, each VRG is associated with a virtualizable resource control list (VRCL) (e.g., 108, 110). The VRCL is a data structure that specifies one or more of the following: (i) which network entities in the VRG can communicate with each other and with network entities in other VRGs and (ii) operational parameters for the VRG or sub-sets of elements therein. For example, the VRCL may specify one or more of the following: (i) which network entities in the VRG can communicate with each other; (ii) maximum latency for packets transmitted between network entities in the VRG; (iii) total bandwidth limits for the VRG; (iv) bandwidth limits for various network entities or flows in the VRG; (v) priority of the VRG relative to other VRGs in a RCAE; (vi) guaranteed bandwidth for the VRG; (vii) bandwidth guaranteed for various network entities or flows in the VRG; and (viii) maximum queue length for virtual output queues (VOQs) (defined below in FIGS. 3A-3B) associated with VRG. The VRCL may specify other information not included above without departing from the invention.

Figure 2A:
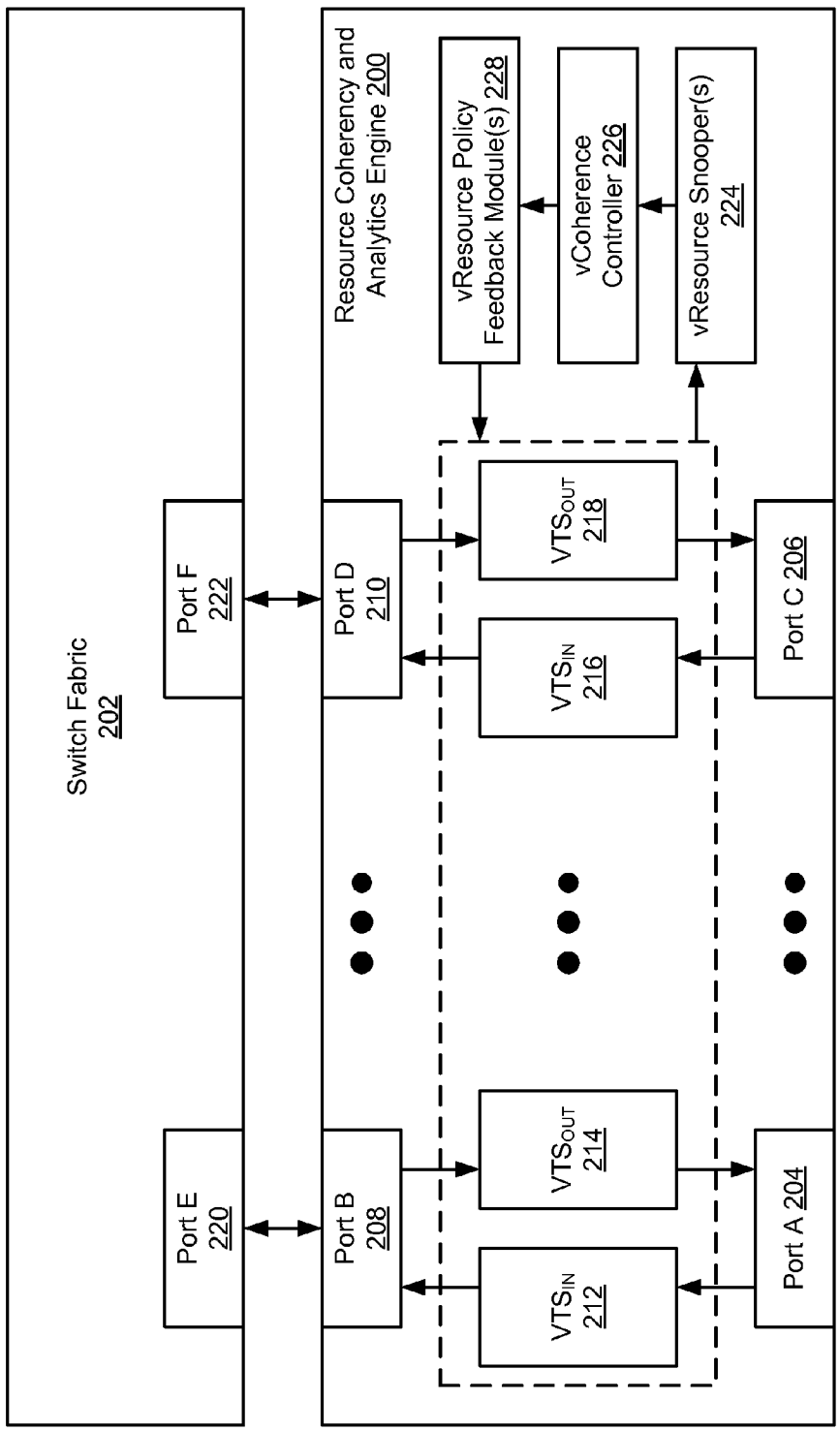
FIGS. 2A-2C show resource coherency and analytics engines in accordance with one or more embodiments of the invention.
Figure 2B:
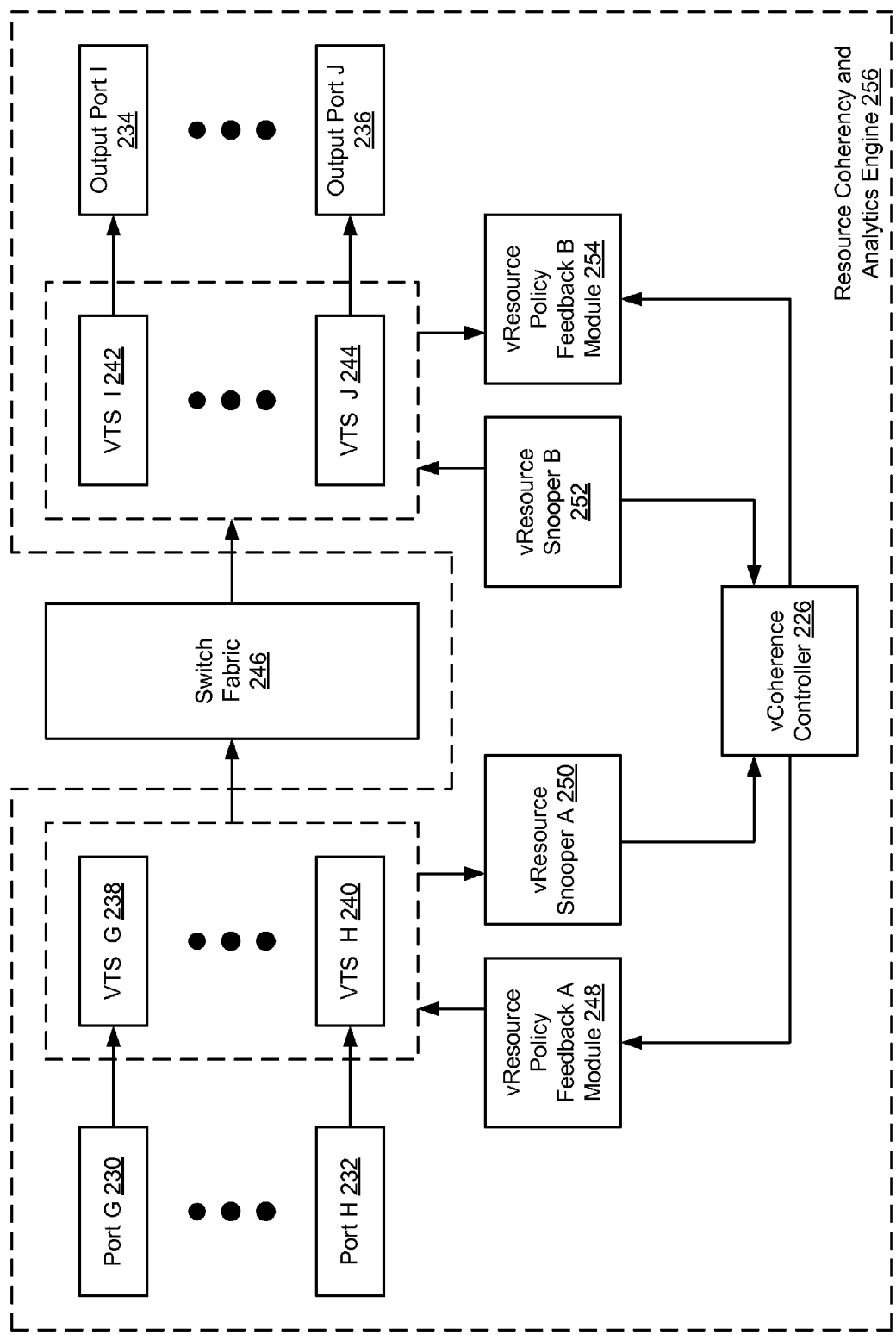
Figure 2C:
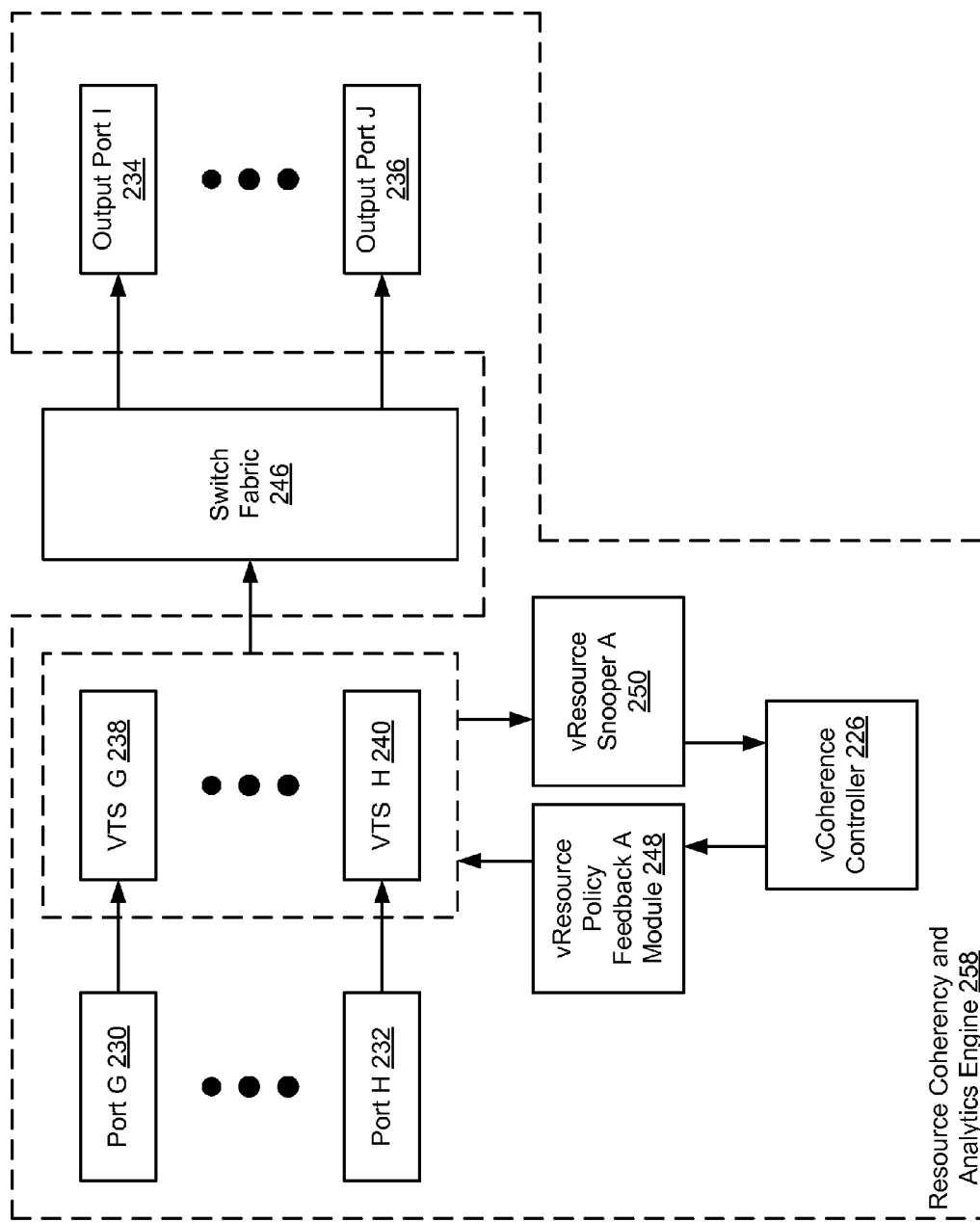

FIGS. 2A-2C show resource coherency and analytics engines in accordance with one or more embodiments of the invention. Referring to FIG. 2A, FIG. 2A shows a RCAE (200) interacting with a switch fabric (202) in accordance with one or more embodiments of the invention. The RCAE (200) includes ports (e.g., 204, 206, 208, 210) configured to receive packets from a network (e.g., a wide area network (WAN), a local area network (LAN), the Internet) or the switch fabric (202) and to provide the packets to the appropriate virtual traffic shaper (VTS) (e.g., 212, 214, 216, 218). The ports in the RCAE may also be used to transmit packets to a network or to the switch fabric. The switch fabric (202) is configured to receive packets from and send packets to the RCAE via ports (e.g., 220, 222) in the switch fabric.

Each VTS is configured to process the packets received from the aforementioned ports and, if appropriate, send the packets to another port in the RCAE. The VTS processes the packets based on operating parameters set by the vCoherence Controller (VCC) (226). In one embodiment of the invention, the operating parameters may be determined based on one or more of the VRCLs.

The operating parameters may include, but are not limited to, virtual output queue (VOQ) length, drain rate of VOQ (referred to as "drain rate"), cut-through policies, and VOQ scheduling policies. In one embodiment of the invention, the VOQ length corresponds to a maximum number of packets that may be queued in the VOQ at any one time. In one embodiment of the invention, the drain rate corresponds to the rate at which packets queued in a given VOQ are removed from the VOQ and scheduled for transmission. The drain rate may be measured as data units/unit time, e.g., megabits/second. In one embodiment of the invention, cut-through policies correspond to policies used to determine whether a given packet should be temporarily stored in a VOQ or if the packet should be sent directly to a VOQ drainer (see FIG. 3A). In one embodiment of the invention, VOQ scheduling policies correspond to policies used to determine the order in which VOQs in a given VTS are processed.

Returning to FIG. 2A, the VCC (226) obtains RCAE statistics from the vResource Snooper (VRS) (224) and uses the RCAE statistics to update and/or modify, as necessary, the operating parameters for one or more VTSs in the RCAE. In one embodiment of the invention, the VCC (226) may obtain RCAE statistics directly from the individual VTSs. Those skilled in the art will appreciate that other mechanisms may be used to obtain the RCAE statistics from the VTS by the VCC without departing from the invention.

Continuing with the discussion of FIG. 2A, in one embodiments of the invention, the VCC (226) includes functionality to obtain RCAE statistics from all VRSs (224) in the RCAE and then to change the drain rates (described below) for one or more VOQ drainers (310 in FIG. 3A) based on the RCAE statistics obtained from all (or a portion) of the VTSs. The VCC (226) may also provide particular RCAE statistics to the VTS or components within the VTS, e.g., the VRCL enqueuer (304 in FIG. 3A) and VOQ Drainer (310 in FIG. 3A), in order for the VTS (or components therein) to perform their functions. Additional details of the operation of the VCC (226) are described in FIG. 7 below. Returning to FIG. 2A, the RVS (224) is configured to obtain RCAE statistics from the individual VTSs. The RCAE statistics may include, but are not limited to, (i) packets received by VTS, (ii) packets dropped by VRG classifier (see FIG. 3A), (iii) packets dropped by the VRCL enqueuer (see FIG. 3A), (iv) packets queued by each VOQ in the VTS, (v) number of cut-through packets, (vi) queue length of each VOQ in the VTS, (vi) number of packets scheduled for transmission by VOQ drainer (see FIG. 3A), and (vii) latency of VTS. The RCAE statistics may be sent to the VRS (224) as they are obtained or may be sent to the VRS (224) at various intervals. Further, the RCAE statistics may be aggregated and/or compressed within the VTS prior to being sent to the VRS (224).

Returning to FIG. 2A, any updates or modifications to the operating parameters of the one or more VTSs are sent to the vResource Policy Feedback Module (RPFM) (228). The RPFM (228) communicates the updates and/or modifications of the operating parameters to the appropriate VTSs. Upon receipt, the VTSs implement the updated and/or modified operating parameters. In another embodiment of the invention, any updates or modifications to the operating parameters of the one or more VTSs are sent directly to the VTSs from the VCC.

Referring to FIG. 2B, FIG. 2B shows a RCAE (256) and a switch fabric (246) in accordance with one or more embodiments of the invention. The RCAE is configured to receive packets from a network via input ports (e.g., 230, 232). The packets received at the input ports are sent to the VTS (e.g., 238, 240) associated with the specific input port (e.g., input port G (230) sends packets to VTS G (238)). The VTS processes the packets it receives in accordance with operating parameters specified by the VCC (226) and communicated to the VTSs via RPFM A (248). Further, the VCC (226) may update and/or modify the operating parameters for the VTSs using RCAE statistics obtained via VRS A (250) and VRS B (252). Based on the processing of the various VTSs (e.g., 238, 240), one or more packets are sent to the switch fabric (246).

Upon receipt, the switch fabric (246) transmits the packets to the appropriate VTS (e.g., 242, 244) on the egress side of the switch fabric. The VTSs (e.g., 242, 244) process the packets they receive in accordance with operating parameters specified by the VCC (226) and communicated to the VTSs via RPFM B (254). Further, the VCC (226) may update and/or modify the operating parameters for the VTSs using RCAE statistics obtained via VRS A (250) and VRS B (252). Based on the processing the various VTSs (e.g., 242, 244), one or more packets are sent to the appropriate output port (e.g., VTS I (242) sends packets to output port I (234)).

Referring to FIG. 2C, FIG. 2C shows a RCAE (258) and a switch fabric (246) in accordance with one or more embodiments of the invention. The RCAE (258) in FIG. 2C is the same as the RCAE (256) in FIG. 2B except that the RCAE (258) in FIG. 2C does not include VTSs on the egress side of the switch fabric (246). Rather, the switch fabric (246) sends packets that are received directly to the appropriate output port (234, 236).

Figure 3A:
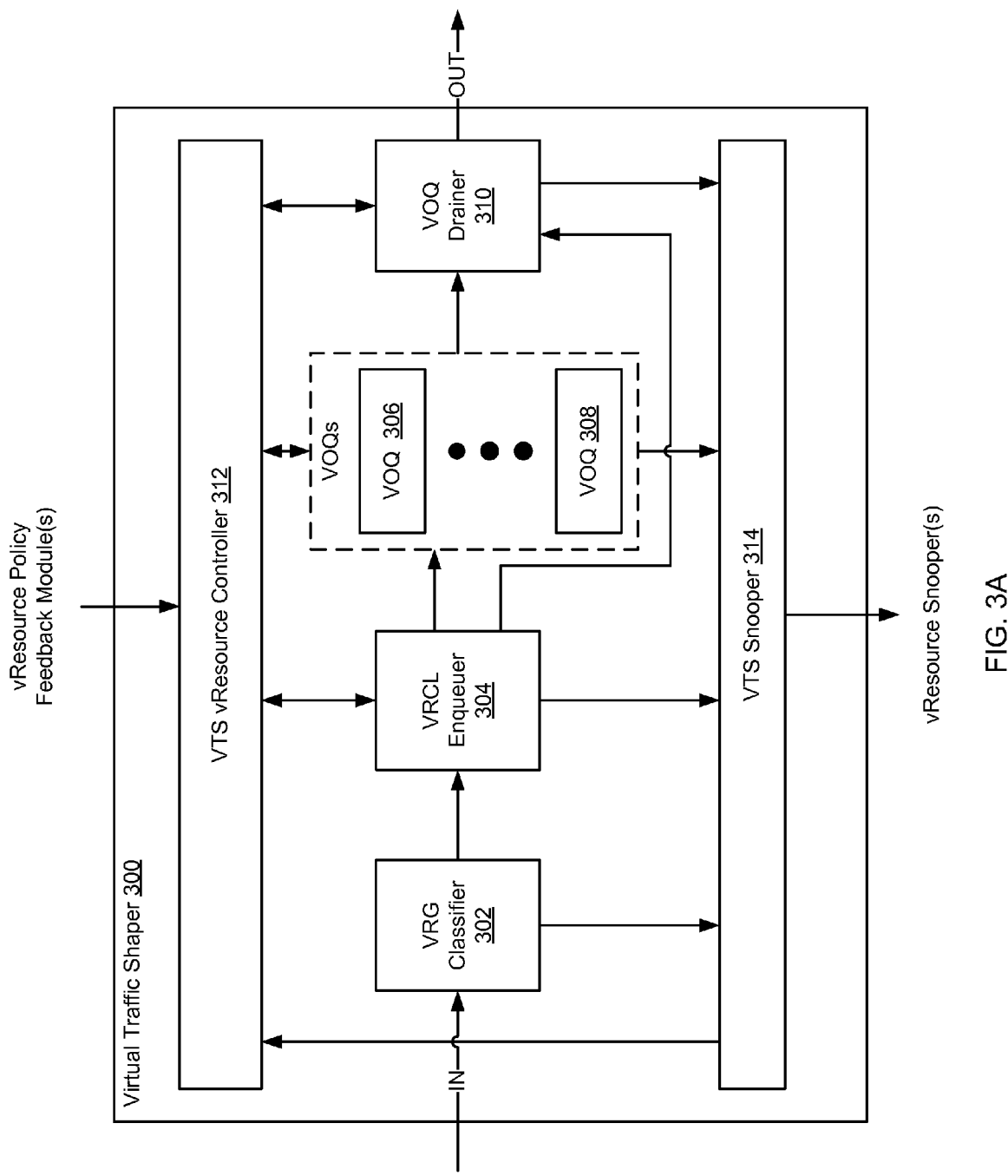
FIGS. 3A-3B show virtual traffic shapers in accordance with one or more embodiments of the invention.
Figure 3B:
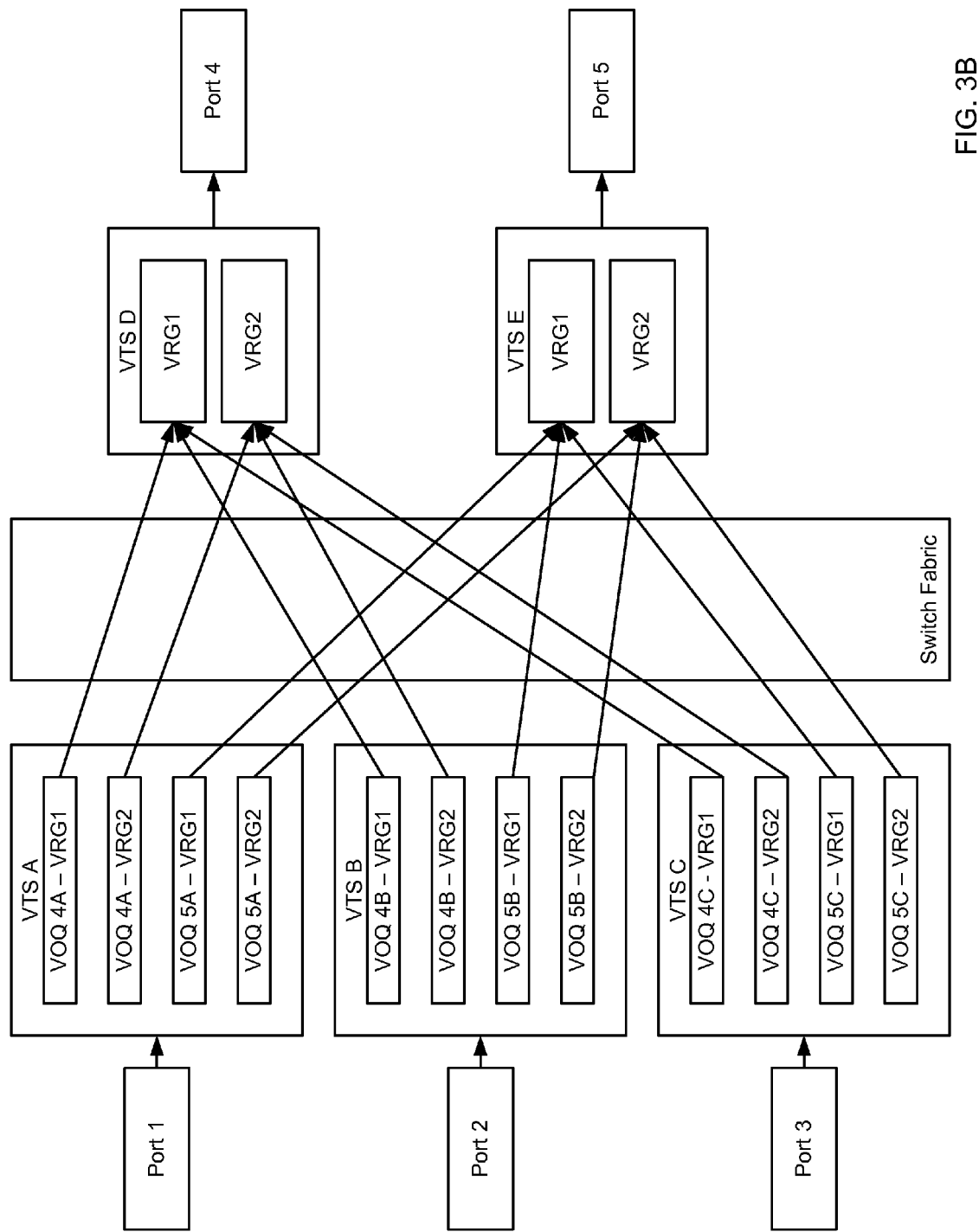

FIGS. 3A-3B show virtual traffic shapers (VTSs) in accordance with one or more embodiments of the invention. FIG. 3A shows a virtual traffic shaper (VTS) (300) in accordance with one or more embodiments of the invention. The VTS includes a VRG classifier (302), a VRCL enqueuer (304), one or more VOQs (e.g., 306, 308), a VOQ drainer (310), a VTS VRC (312) and a VTS Snooper (314). Each of these components is described below.

In one embodiment of the invention, the VRG classifier includes one or more classification tables (not shown). The classification tables include: (i) mappings between packet header information (or portions thereof) (e.g., OSI layer 2-OSI layer 7) and VRGs; and (ii) mappings between packet header information (or portions thereof) and egress physical ports (EPP) (i.e., the physical port of the egress side of the switch fabric—e.g., output port I (234) in FIGS. 2B and 2C). The VRG classifier is configured to use the aforementioned classification table(s) to determine the VRG associated with the packet and the EPP for the packet. In one embodiment of the invention, the destination MAC address is used to determine both the VRG and the EPP.

In one embodiment of the invention, the VRCL enqueuer (304) is configured to receive packets from the VRG classifier along with the information about VRG and EPP. The VRCL enqueuer obtains the VRCL associated with the VRG. The VRCL enqueuer, using the VRCL and the EPP, determines whether to drop the packet, queue the packet in the appropriate VOQ, or designate the packet as cut-through packet, thereby sending the packet directly to the VOQ drainer (310).

In one embodiment of the invention, the VTS includes one or more VOQs (e.g., 306, 308). In one embodiment of the invention, each VOQ is associated with a unique buffer. In another embodiment of the invention, the VOQs all share a common buffer, with each VOQ using only a specified portion of the buffer. Each VOQ is associated with a unique VRG-EPP pair. In one embodiment of the invention, each VTS includes a VOQ for each VRG-EPP pair combination that is possible for the RCAE. In another embodiments of the invention, one or more VOQs are dynamically created when they are initially required to store packets (e.g., when the first packet for a given VRG-EPP pair is received by the VTS). In another embodiment of the invention certain VOQs are created when the VTS is created while other VOQs are dynamically created while the VTS is executing. Further, one or more VOQs may be deallocated if no packets for a given VRG-EPP pair are received for a pre-determined period of time.

Continuing with FIG. 3A, in one embodiment of the invention, the VOQ drainer (310) is configured to obtain packets from the VOQs based on operating parameters set by the VCC (226 in FIGS. 2A-2C). Once the VOQ drainer determines that a given packet is to be processed, the VOQ drainer obtains a packet from a VOQ and schedules the packet for transmission to a network, a network entity, or a switch fabric. In one embodiment of the invention, scheduling a packet for transmission corresponds to initiating the process of transmitting the packet, e.g., performing any steps required to prepare the packet for transmission based on the protocol to be used to transmit the packet. The scheduling occurs after a packet has been selected for transmission but prior to the packet actually being transmitted. Once the packet is scheduled it is typically transmitted in due course.

In one embodiment of the invention, the VTS snooper (314) is configured to collect RCAE statistics (discussed above) for the particular VTS. The VTS snooper may send the raw data corresponding to the RCAE statistics to the VRS (250 in FIG. 2B) or, alternatively, may process the raw data (aggregate, compress, etc.) and then send the processed data to the VRS. In one embodiment of the invention, the VTS VRC (312) is configured to receive updated and/or modified operating parameters for the VTS from the RPFM (248 in FIG. 2B).

FIG. 3B shows an example of VOQs in a RCAE in accordance with one or more embodiments of the invention. For the purposes of this example, assume that the RCAE corresponds to the implementation in FIG. 2B and that there are two VRGs associated with the RCAE. Further, for purposes of this example, various features of the RCAE are omitted in FIG. 3B to aid in the illustration of certain aspects of the invention.

Referring to FIG. 3B, the RCAE includes three input ports (also referred to as ingress ports) (i.e., port 1, port 2, port 3) and two output ports (also referred to as egress ports or egress physical ports) (i.e., port 4, port 5). Each ingress port includes a dedicated VTS, i.e., VTS A is dedicated to port 1, VTS B is dedicated to port 2, and VTS C is dedicated to port 3. In each VTS, there is a unique VOQ-output port (OP) pair for each VRG-OP combination. Accordingly, VTS A includes the following VOQs, namely, one for each VRG-OP pair: (i) VOQ 4A-VRG1, (ii) VOQ 4A-VRG2, (iii) VOQ 5A-VRG1, and VOQ 5A-VRG2. Similarly, VTS B includes the following VOQs: (i) VOQ 4B-VRG1, (ii) VOQ 4B-VRG2, (iii) VOQ 5B-VRG1, and VOQ 5B-VRG2. Finally, VTS C includes the following VOQs: (i) VOQ 4C-VRG1, (ii) VOQ 4C-VRG2, (iii) VOQ 5C-VRG1, and VOQ 5C-VRG2.

On the egress side of the switch fabric, VTS D and VTS E are configured to receive packets from the switch fabric that originated on the ingress side of the switch fabric. More specifically, VTS D is configured to receive all packets (regardless of which VRG a given packet is associated) for port 4 and VTS E is configured to receive all packets for port 5. With respect to VTS D, VTS D includes two VOQs—one for each VRG. Accordingly, packets from VOQ 4A-VRG1, VOQ 4B-VRG1, and VOQ 4C-VRG1 are stored in the VOQ corresponding to VRG1 in VTS D. Further, packets from VOQ 4A-VRG2, VOQ 4B-VRG2, and VOQ 4C-VRG2 are stored in the VOQ corresponding to VRG2 in VTS D.

Similarly, VTS E includes two VOQs—one for each VRG. Accordingly, packets from VOQ 5A-VRG1, VOQ 5B-VRG1, and VOQ 5C-VRG1 are stored in the VOQ corresponding to VRG1 in VTS E. Further, packets from VOQ 5A-VRG2, VOQ 5B-VRG2, and VOQ 5C-VRG2 are stored in the VOQ corresponding to VRG2 in VTS E.

If the RCAE is implemented in accordance with FIG. 2C, then the RCAE would not include VTS D or VTS E. In such a scenario, all packets for a given output port, regardless with which VRG they are associated, would be sent directly to the appropriate output port upon exiting the switch fabric. Accordingly, packets from VOQ 4A-VRG1, VOQ 4B-VRG1, VOQ 4C-VRG1, VOQ 4A-VRG2, VOQ 4B-VRG2, and VOQ 4C would be sent to port 4. Similarly, packets from VOQ 5A-VRG1, VOQ 5B-VRG1, VOQ 5C-VRG1, VOQ 5A-VRG2, VOQ 5B-VRG2, and VOQ 5C-VRG2 would be sent to port 5.

FIGS. 4-7 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 4:
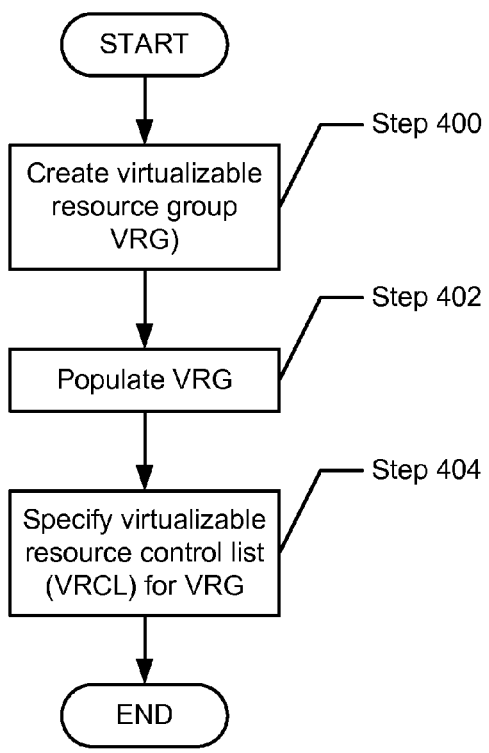
FIGS. 4-7 show flowcharts in accordance with one or more embodiments of the invention.

FIG. 4 shows a flowchart in accordance with one embodiment of the invention. More specifically, FIG. 4 shows a flowchart for creating and populating a VRG and VRCL in accordance with one or more embodiments of the invention. In Step 400, a VRG is created. In one embodiment of the invention, creating a VRG includes creating a VRG data structure, where the VRG data structure is assigned an identifier (e.g., a name) and is initially not populated with any network entities. In Step 402, the VRG is populated. In one embodiment of the invention, the VRG is populated with identifiers of network entities, flows, and/or other VRGs. Further, as discussed above, the network entities may be associated with a virtual network, where the virtual network is added to the VRG (as opposed to adding the individual network entities of the virtual network individually). In Step 404, a VRCL is associated with the VRG. At this stage, the RCAE may use the above information to monitor and manage the flow of packets between elements in the VRG. The VRCL may be populated prior to being associated with the VRG or the VRCL may be populated after being associated with the VRG.

Figure 5:
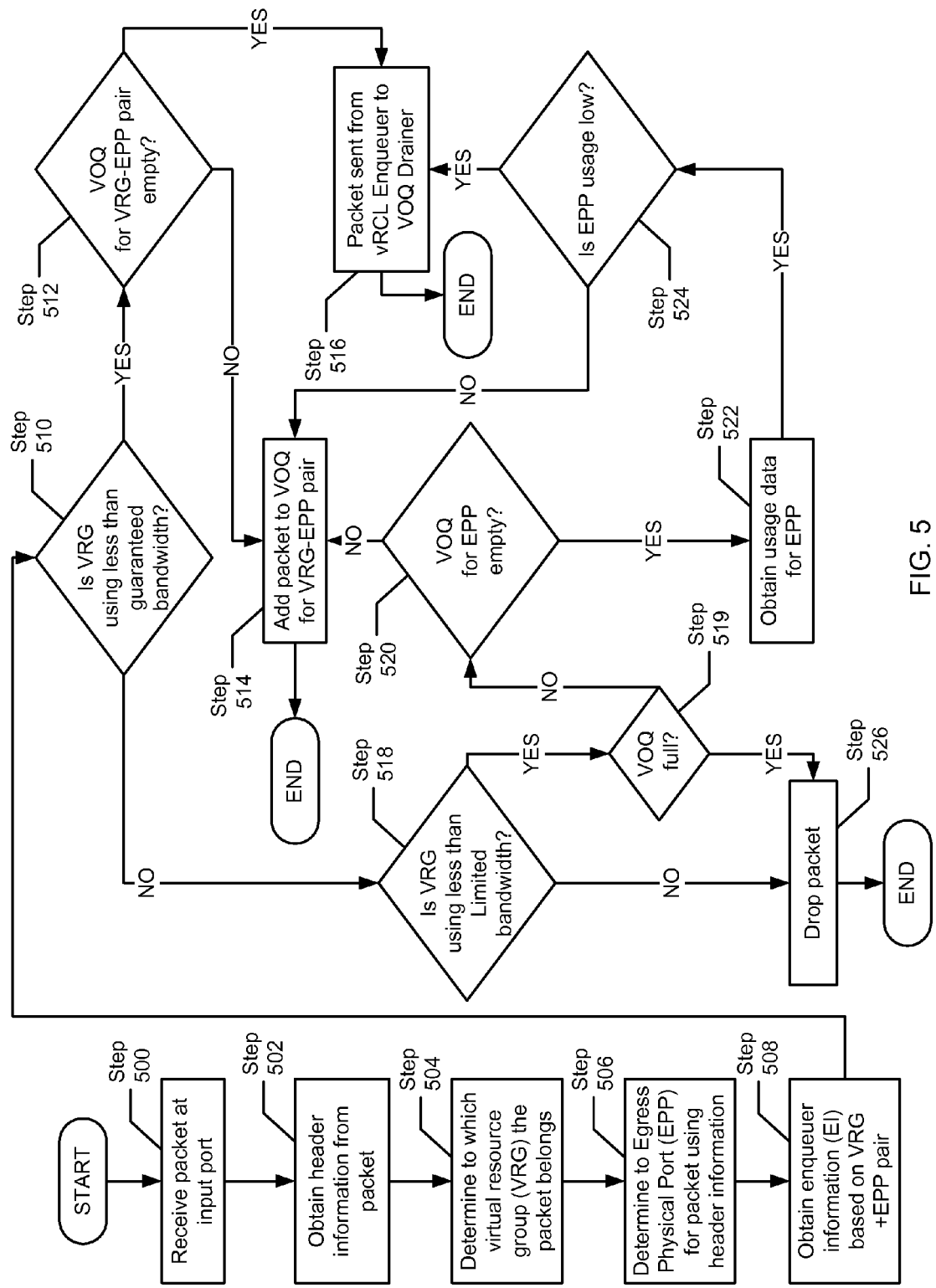

FIG. 5 shows a flowchart in accordance with one embodiment of the invention. More specifically, FIG. 5 shows a method for processing packets received by a VTS in accordance with one or more embodiments of the invention. In Step 500, a packet is received at an input port for the RCAE. The packet is then forwarded to the appropriate VTS (e.g., in FIG. 3B packets received by port 1 are forwarded to VTS A). In Step 502, the header information is obtained from the packet. In one embodiment of the invention, step 502 is performed by a VRG classifier.

In Step 504, the VRG associated with the packet is determined using the header information obtained in Step 502. In one embodiment of the invention, Step 502 is performed by a VRG classifier. In Step 506, the egress physical port (EPP) (e.g., port 4 in FIG. 3B) is determined using the header information. In one embodiment of the invention, step 506 is performed by a VRG classifier.

In Step 508, the enqueuer information (EI) is obtained using the VRG and the EPP information obtained in Steps 504 and 506, respectively. In one embodiment of the invention, the EI includes, but is not limited to, the VRCL associated with the VRG and the RCAE statistics associated with the VRG. In one embodiment of the invention, Step 508 is performed by a VRCL enqueuer.

In Step 510, a determination is made about whether the VRG (identified in Step 504) is using less than its guaranteed bandwidth. In one embodiment of the invention, the guaranteed bandwidth for the VRG is determined using the VRCL (obtained in Step 508) and the current bandwidth usage of the VRG is determined using RCAE statistics (obtained in Step 508). In one embodiment of the invention, the guaranteed bandwidth for the VRG corresponds to the minimum bandwidth that the VRG is guaranteed. Alternatively (or in addition to a guaranteed bandwidth for entire VRG), the VRCL may specify a guaranteed bandwidth for a particular pair of network entities, for a flow, and/or between a network entity and another VRG specified in the VRG. In such cases, Step 510 does not use the global guaranteed bandwidth and instead uses the more granular guaranteed bandwidth specified in the VRCL. If the VRG is using less than its guaranteed bandwidth, then the process proceeds to Step 512; otherwise the process proceeds to Step 518.

In Step 512, a determination is made about whether the VOQ for the VRG-EPP pair is empty. If the VOQ for the VRG-EPP pair is empty, the process proceeds to Step 516; otherwise the process proceeds to Step 514. In Step 514, the packet is added to the VOQ for the VRG-EPP pair. Those skilled in the art will appreciate that if the VOQ for the VRG-EPP pair does not exist prior to step 514, the VOQ is created prior to storing the packet. Further, those skilled in the art will appreciate that the packet may only be stored in the VOQ if there is sufficient space in the VOQ. Accordingly, if there is not sufficient space in the VOQ then the packet may be dropped.

Continuing with FIG. 5, in Step 516, the packet is designated as a cut-through packet and is sent directly to the VOQ drainer in the VTS. In Step 518, a determination is made about whether the VRG (identified in Step 504) is using less than its limited bandwidth. In one embodiment of the invention, the limited bandwidth for the VRG is determined using the VRCL (obtained in Step 508) and the current bandwidth usage of the VRG is determined using RCAE statistics (obtained in Step 508). In one embodiment of the invention, the limited bandwidth for the VRG corresponds to the maximum bandwidth that the VRG can use. Alternatively (or in addition to a limited bandwidth for entire VRG), the VRCL may specify a limited bandwidth for a particular pair of network entities, for a flow, and/or between a network entity and another VRG specified in the VRG. In such cases, Step 518 does not use the global limited bandwidth and instead uses the more granular limited bandwidth specified in the VRCL. The limited bandwidth is greater than or equal to the guaranteed bandwidth. If the VRG is using less than its limited bandwidth, then the process proceeds to Step 519; otherwise the process proceeds to Step 526.

In Step 519 a determination is made about whether the VOQ for the VRG-EPP pair is full. In one embodiment of the invention, VOQ is deemed "full" when (i) the number of packets in the VOQ exceeds a pre-determined threshold, (ii) the particular VOQ is using more than a pre-defined amount of shared memory, where the memory shared, for example, with other VOQs, or (iii) all credits associated with a VOQ are currently exhausted where the amount of memory associated with the VOQ is implemented using a credit scheme such as a leaky bucket algorithm. Those skilled in the art will appreciate that other mechanisms to determine whether the VOQ is "full" may be used without departing from the invention. If the VOQ for the VRG-EPP pair is full, the process proceeds to Step 526; other the process proceeds to Step 520.

In Step 520, a determination is made about whether the VOQ for the VRG-EPP pair is empty. If the VOQ for the VRG-EPP pair is empty, the process proceeds to Step 522; otherwise the process proceeds to Step 514. In Step 522, the usage data from the EPP is obtained. The usage data for the EPP may be obtained from the RCAE statistics for the VTS. In Step 524, a determination is made about whether the EPP usage is low. In one embodiment of the invention, the VTS (or a component therein), the VRCL or a component external to the VTS (e.g., VCC (226) in FIG. 2A-2C) sets EPP usage thresholds, which are used to make the determination in Step 524. In one embodiment of the invention, EPP usage is determined to be low when less than a pre-determined number of packets have been sent to the EPP from the VOQ drainer in a pre-determined time period. If the EPP usage is low, the process proceeds to Step 516; otherwise the process proceeds to Step 514.

In Step 526, the packet is dropped by the VTS. In one embodiment of the invention, Steps 510-526 are performed by the VRCL enqueuer. Further, though not shown in FIG. 5, if the source of the packet is not permitted to transmit packets to the destination of packet (e.g., as determined by the header information in the packet) based on the VRCL, then the packet is dropped prior to Step 510.

Figure 6:
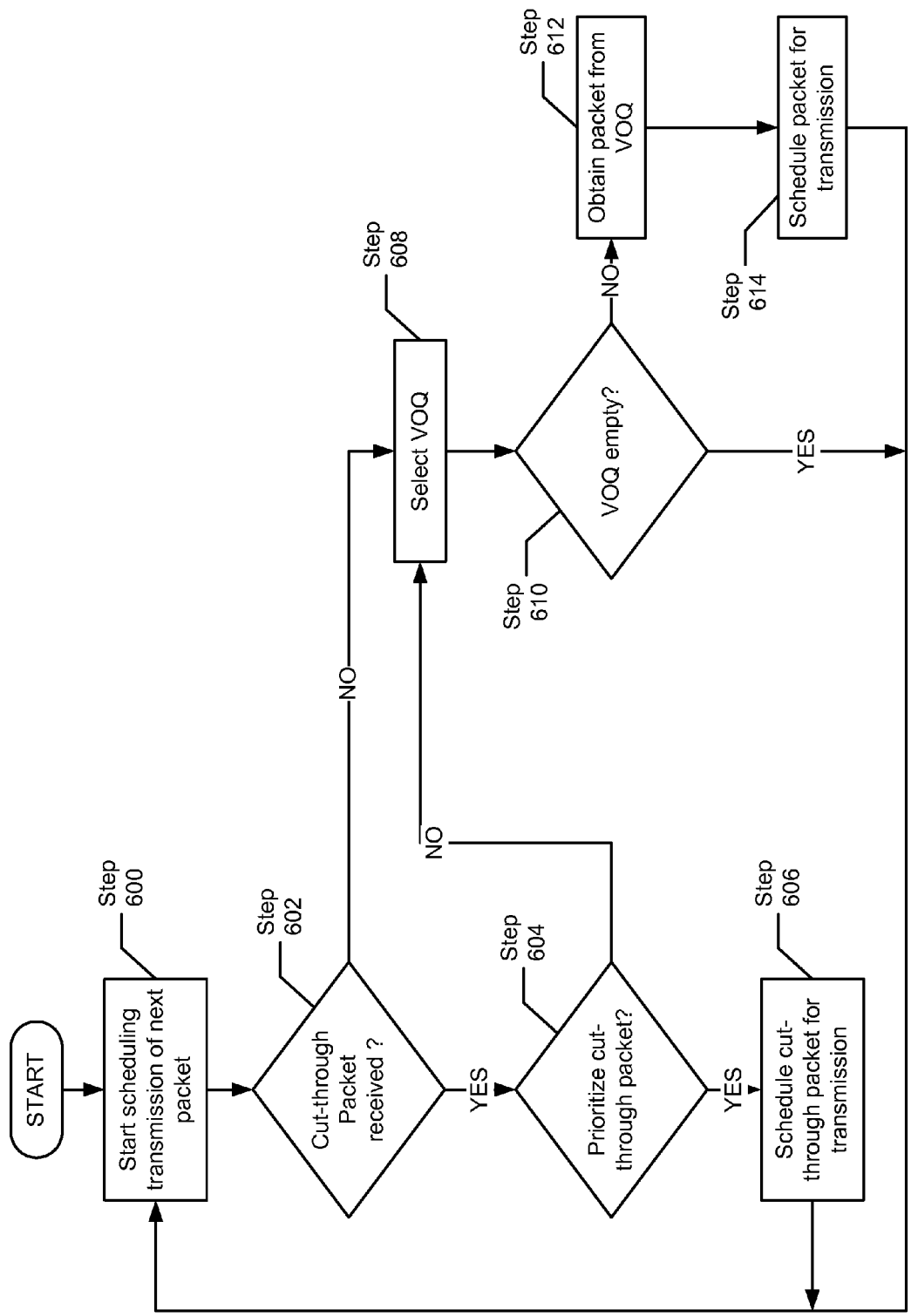

FIG. 6 shows a flowchart in accordance with one embodiment of the invention. FIG. 6 shows a method for use by the VOQ drainer to schedule packets in the VTS for transmission. In Step 600, the VOQ drainer starts the process of scheduling the transmission of the next packet. In Step 602, a determination is made about whether a cut-through packet is received by the VOQ drainer. If a cut-through packet is received, the process proceeds to Step 604; otherwise the process proceeds to Step 608.

In Step 604, a determination is made about whether to prioritize the cut-through packet. The determination in Step 604 may be based, in part, on whether queued packets in the VOQ have any minimum latency guarantees and, if so, whether those guarantees will be met if the cut-through packet is prioritized. The determination is Step 604 may also be used to prevent an excess of cut-through packets from effectively blocking packets queued in the VOQ. If the cut-through packet is to be prioritized, the process proceeds to Step 606; otherwise the process proceeds to Step 608. If the cut-through packet is not prioritized, the cut-through packet may be temporarily buffered in the VOQ drainer. In Step 606, the cut-through packet is scheduled for transmission.

In Step 608, a VOQ is selected. In one embodiment of the invention, the selection of a VOQ is based on a policy specified by the VCC and/or VRCL. Alternatively, the selection may be based on a selection algorithm implemented by the VOQ. Examples of selection algorithms include, but are not limited to, round-robin (including deficit, weighted, or modified-deficit), fair queuing (including weighted fair queuing). Further examples of selection algorithms may include drain rate controls on individual queues such as single or double leaky bucket drain rate schemes. Further examples of selection algorithms may preferentially select or modify the selection weight or VOQs that operate below some allocated threshold or thresholds. In Step 610, a determination is made about whether the VOQ (selected in Step 608) is empty. If the VOQ (selected in Step 608) is empty, the process proceeds to Step 600; otherwise the process proceeds to Step 612.

In Step 612, a packet in the selected VOQ is obtained. In one embodiment of the invention, the VOQ is a first-in first-out (FIFO) queue and the packet that is at the "front" of the VOQ is obtained. Alternatively, if the packets are tagged or otherwise prioritized in the VOQ, then the packet with the highest priority is obtained. In Step 614, the packet is scheduled for transmission.

Figure 7:
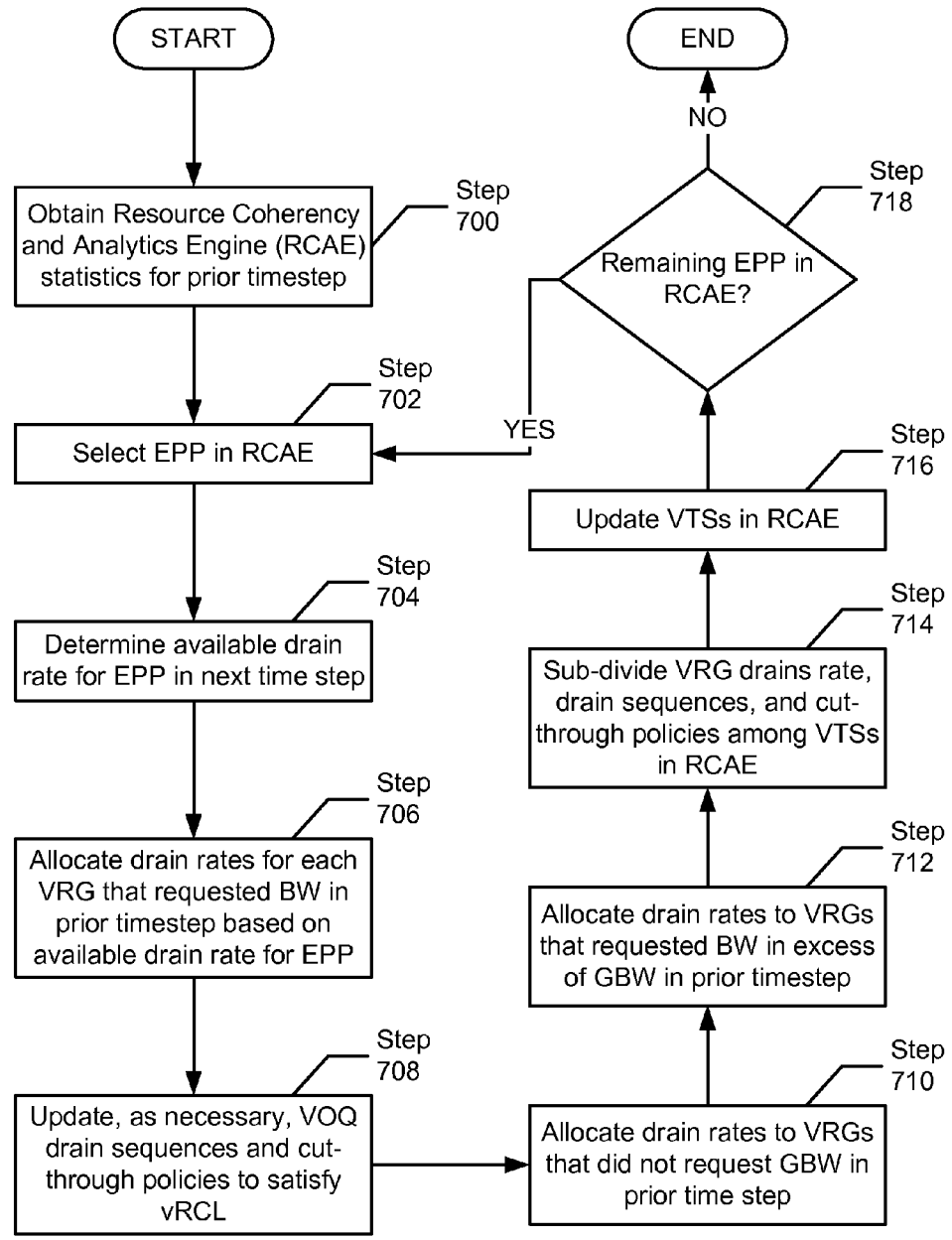
Figure 8:
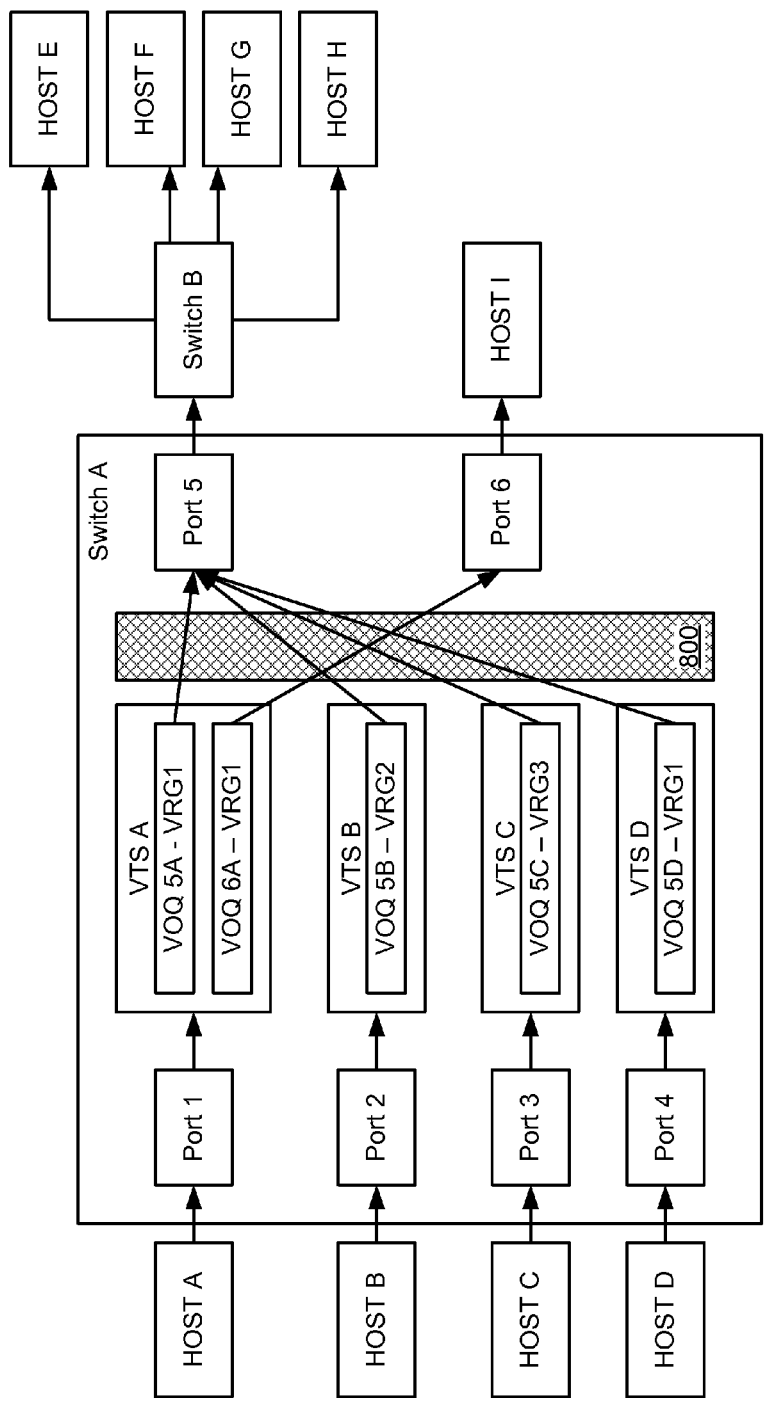

FIG. 7 shows a flowchart in accordance with one embodiment of the invention. More specifically, FIG. 7 shows a method performed by the vCoherence Controller (VCC) in one or more embodiments of the invention.

In Step 700, the RCAE statistics for the prior time step are obtained. Those skilled in the art will appreciate that the RCAE statistics may be continuously received from the VRS (e.g., 250 in FIG. 2B). Alternatively, the RCAE statistics may be received at set intervals (which may or may not be uniform across all VRSs) or once a certain amount of data is collected by a VTS Snooper or VRS. In another embodiment of the invention, the VCC may not receive RCAE statistics until they are requested by the VCC.

In Step 702, an egress physical port (EPP) (e.g., output port I (234) in FIG. 2C) is selected. In Step 704, the available drain rate for the EPP (selected in Step 702) in the next time is determined. In one embodiment of the invention, the available drain rate is determined as the physical maximum bandwidth of the EPP. In another embodiment the available bandwidth may have been reduce by link-level congestion controls that pause transmission on the EPP or set the bandwidth to a reduced amount.

In Step 706, the available drain rate (determined in Step 704) is allocated across all VRGs that requested bandwidth (i.e., sent packets to the EPP) in the prior time step. In one embodiment of the invention, the allocation in Step 706 is made based at least, in-part, on guaranteed bandwidth limits specified in the VRCLs associated with the VRGs that sent packets to the EPP.

In Step 708, the VOQ drain sequences (see Step 608 in FIG. 6) and cut-through policies (see FIG. 5) are updated to satisfy each VRCL, where there is a VRCL associated with each VRG that sent packets to the EPP. In Step 710, to the extent there are excess drain rates to allocate, all or a portion of the remaining unallocated drain rates are allocated to VRGs that did not request their guaranteed bandwidth in the prior time step.

In Step 712, to the extent there is excess drain rates to allocate, all or a portion of the remaining unallocated drain rates are allocated to VRGs that requested more than their guaranteed bandwidth (but less than the limited bandwidth) in the prior time step. In Step 714, the drain rates allocated to each of the VRGs in Steps 706, 710, and 712 are sub-divided across VTSs (and/or components therein) that process packets for the given VRGs. Further, a determination is made about how to apply the cut-through policies and VOQ drainer sequences for a VRG across the various VTSs (and/or components therein) that process packets for the given VRGs. Further, one or more of the above allocation of drain rates may include calculations using data collected over multiple previous requested bandwidths and drain rates.

In Step 716, the VTSs (or components therein) are updated in the RCAE using, for example, the appropriate vResource Policy Feedback Modules and VTS vResource Controllers. In Step 718, a determination is made about whether any other EPPs in the RCAE need to be processed. If there are remaining EPPs to process, then the process proceeds to Step 702; otherwise the process ends.

The method show in FIG. 7 is performed at every time step. The time steps may be uniform in length or may be of various lengths. The length of the time steps and the magnitude of the changes of the operating parameters may be performed in accordance with known control loop theory. Furthermore different VOQs may have different time steps. For example, performance levels in the VRCLs for some VOQs may require more frequent modification to its drain rate than for other VOQs.

The following section describes various examples in accordance with one or more embodiments of the invention. The examples are intended to aid in the understanding of the invention and are not intended to limit the invention.

FIGS. 8A-8B show an example of a Resource Coherency and Analytics Engine (RCAE) implemented in a switch in accordance with one or more embodiments of the invention.

As shown in FIG. 8A, the Switch A includes a RCAE (not denoted in FIG. 8A) and a switch fabric (800). The RCAE includes four input ports (i.e., port 1, port 2, port 3, port 4), two output ports (i.e., port 5 and port 6), and four virtual traffic shapers (i.e., VTS A, VTS B, VTS C, VTS D). Further, the RCAE supports three VRGs (i.e., VRG1, VRG2, and VRG3). As shown in FIG. 8B, VRG1 includes host A, host D, host E, host F, and host I, VRG2 includes host B and host G, and VRG3 includes host C and host H.

Referring to FIG. 8A, host A is connected to port 1, host B is connected to port 2, host C is connected to port 3, and host D is connected to port 4. Further, port 5 is connected to switch B and port 6 is connected to host I. Finally, switch B is connected to host E, host F, host G, and host H. Based on the above VRGs, hosts in VRG1 can only send packets to other hosts in VRG1. Similarly, hosts in VRG2 can only send packets to other hosts in VRG2, and host in VRG3 can only send packets to other hosts in VRG3.

VTS A only includes VOQs corresponding to VRG-EPP pairs that are currently being used. For example, VTS A includes a VOQ for VRG1-Port 5 and VTS B includes a VOQ for VRG1-Port 6. Similarly, VTS B includes a VOQ for VRG2-Port 5, VTS C includes a VOQ for VRG3-Port 5, and VTS D includes a VOQ for VRG1-Port 5.

The following describes the implementation of the method in FIG. 7 to port 5. Initially, the RCAE statistics for port 5 are obtained and a determination is made about the available drain rate for port 5 in the next time step. Once the available drain rate is determined, the available drain rate is allocated to VRGs that have issued packets to port 5 in the prior time step. In this example, assume that packets have only been issued by VRG1 and VRG3. Accordingly, VRG1 and VRG3 are allocated portions of the available drain rate up to their guaranteed bandwidth. At this stage, the VCC (not shown) may also update the VOQ drain sequences and/or cut-through policies to satisfy the VRCLs associated with each of VRG1, VRG2, and VRG3.

If there is remaining unallocated available bandwidth, then at least a portion of the remaining unallocated bandwidth is allocated to VRG2 up to its guaranteed bandwidth. Following the allocation to VRG2, if there is remaining unallocated available bandwidth, then the remaining portion of the remaining unallocated bandwidth is allocated between (or to only one of) VRG1 and VRG3 up to their limited bandwidth.

Finally, the drain rates, VOQ drain sequences and/or cut-through policies allocated to each of the VRGs are divided across all VTSs that support the particular VRGs. For example, the drain rate, VOQ drain sequence(s) and/or cut-through policy(ies) for VRG1 are allocated across VTS A and VTS D. Further, the drain rate, VOQ drain sequence(s) and/or cut-through policy(ies) for VRG2 are allocated to VTS B and the drain rate, VOQ drain sequence(s) and/or cut-through policy(ies) for VRG3 are allocated to VTS C.

Figure 9:
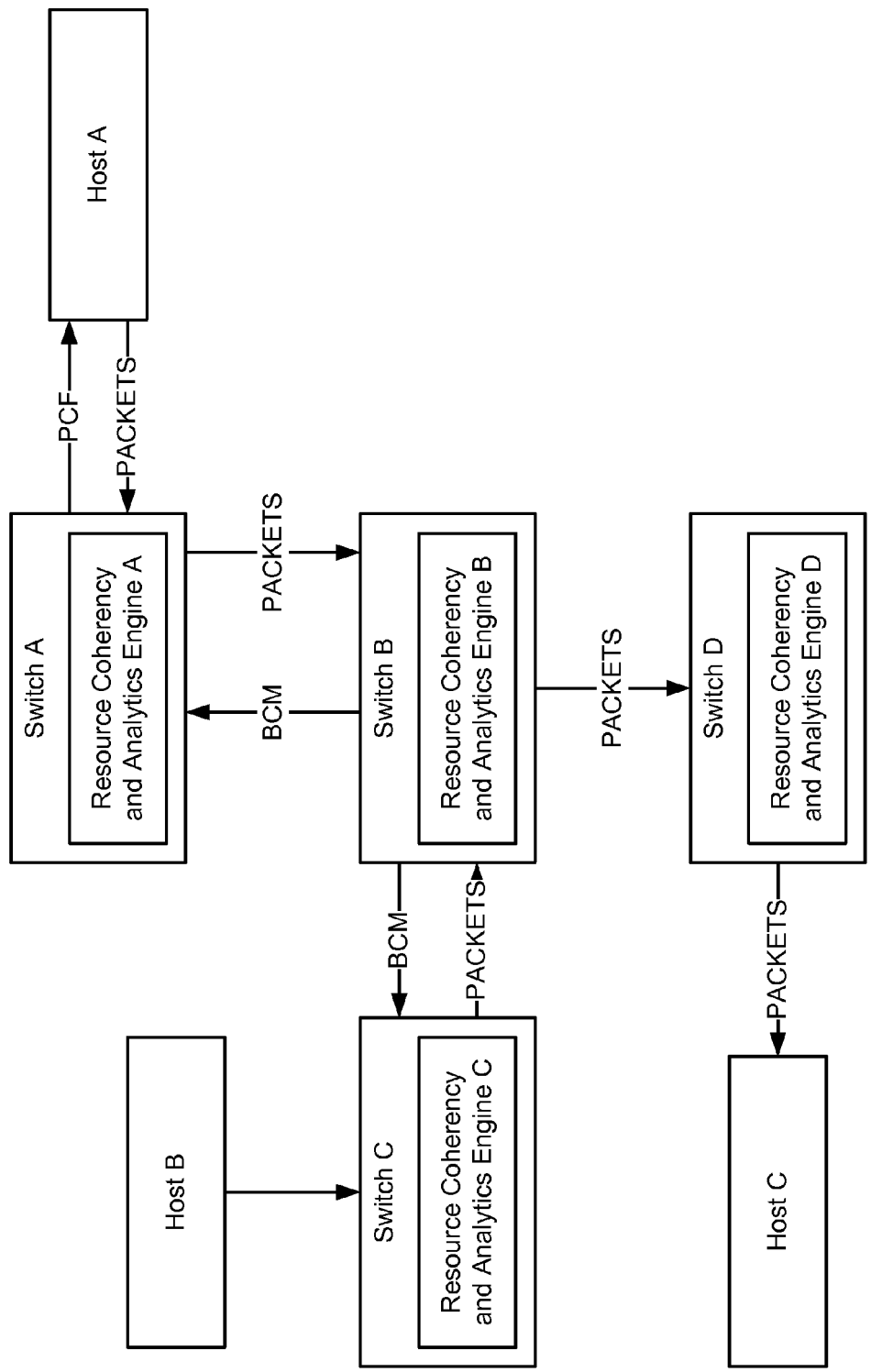

FIG. 9 shows an example of resource coherency and analytics control engines interacting to manage packet traffic across multiple switches. For purposes of this example, assume that host A, host B, and host C all belong to the same VRG and, as such, are allowed to communicate with each other. Further, assume that host A and host B are both sending packets to host C via switch D and that the egress physical port (EPP) on switch B that is connected to Switch D is close to reaching its limited bandwidth (as defined by the VRCL associated with the VRG.

Using RCAE statistics for RCAE B and a bandwidth notification threshold (i.e., a threshold above which the RCAE issues bandwidth control messages), RCAE B determines that the bandwidth notification threshold has been exceeded. The bandwidth notification threshold may be based on the depth of one or more of the VOQs associated. Alternatively, the bandwidth notification threshold may be deemed to be exceeded when RCAE B instructs the VTS to stop scheduling the packets in the VOQ for transmission or instructs the VTS to decrease a rate at which the VTS schedules the packets in the VOQ for transmission. Those skilled in the art will appreciate that the bandwidth notification threshold may be based on other metrics without departing from the invention.

Continuing with FIG. 9, in response to this determination, RCAE B reduces the drain rate for the EPP connected to switch D to prevent the EPP from reaching the limited bandwidth as specified in the VRCL. In addition, the above determination triggers the RCAE B to issue bandwidth control messages (BCMs) to switch C and switch A. In one embodiment of the invention, the BCM to switch A includes, but is not limited to, information to identify the VRG associated with the VOQ on RCAE B that triggered the issuance of the BCM, information to identify the EPP on RCAE B (i.e., the EPP on switch C connected to switch D), information about the current depth of the VOQ in RCAE B of the VTS that processes packets received from switch A, and a recommended drain rate for the EPP in RCAE A that is connected to switch B.

Similarly, the BCM to switch C includes, but is not limited to, information to identify the VRG associated with the VOQ on RCAE B that triggered the issuance of the BCM, information to identify the EPP on RCAE B (i.e., the EPP on switch C connected to switch D), information about the current depth of the VOQ in RCAE B of the VTS that processes packets received from switch C, and a recommended drain rate for the EPP in RCAE C that is connected to switch B.

In one embodiment of the invention, the BCMs are transmitted to the appropriate switches using an out-of-band communication channel, i.e., a communication channel or connection that is different than the communication channel used to communicate packets between the switches.

In response to receiving the BCM from switch B, RCAE A in switch A may update one or more operating parameters in RCAE A. For example, the operating parameters for the VTS in RCAE A that is receiving packets from host A may be updated to decrease its drain rate for the EPP connected to switch B. In another embodiment of the invention, the vCoherence Controller (VCC) in RCAE A receives the BCM and updates the drain rate for the VOQs draining to the EPP on RCAE that is transmitted packets to Switch B. In one embodiment of the invention, the drain rate calculated for a VOQ using both RCAE statistics from RCAE A and the BCM from switch B is less than the drain rate calculated using on the RCAE statistics. Said another way, the VCC may use the BCM to further decrease the drain rate for a given VOQ, even though the RCAE statistic would allow for a higher drain rate.

Further, switch A may issue a pause-control-frame (PCF) as defined by IEEE 802.3x or any other standard to host A. The PCF may request host A to decrease the rate at which it sends packets to switch A.

In response to receiving the BCM from switch B, RCAE C in switch C may update one or more operating parameters in RCAE C. For example, the operating parameters for the VTS in RCAE C that is receiving packets from host C may be updated to decrease its drain rate for the EPP connected to switch B.

Figure 10A:
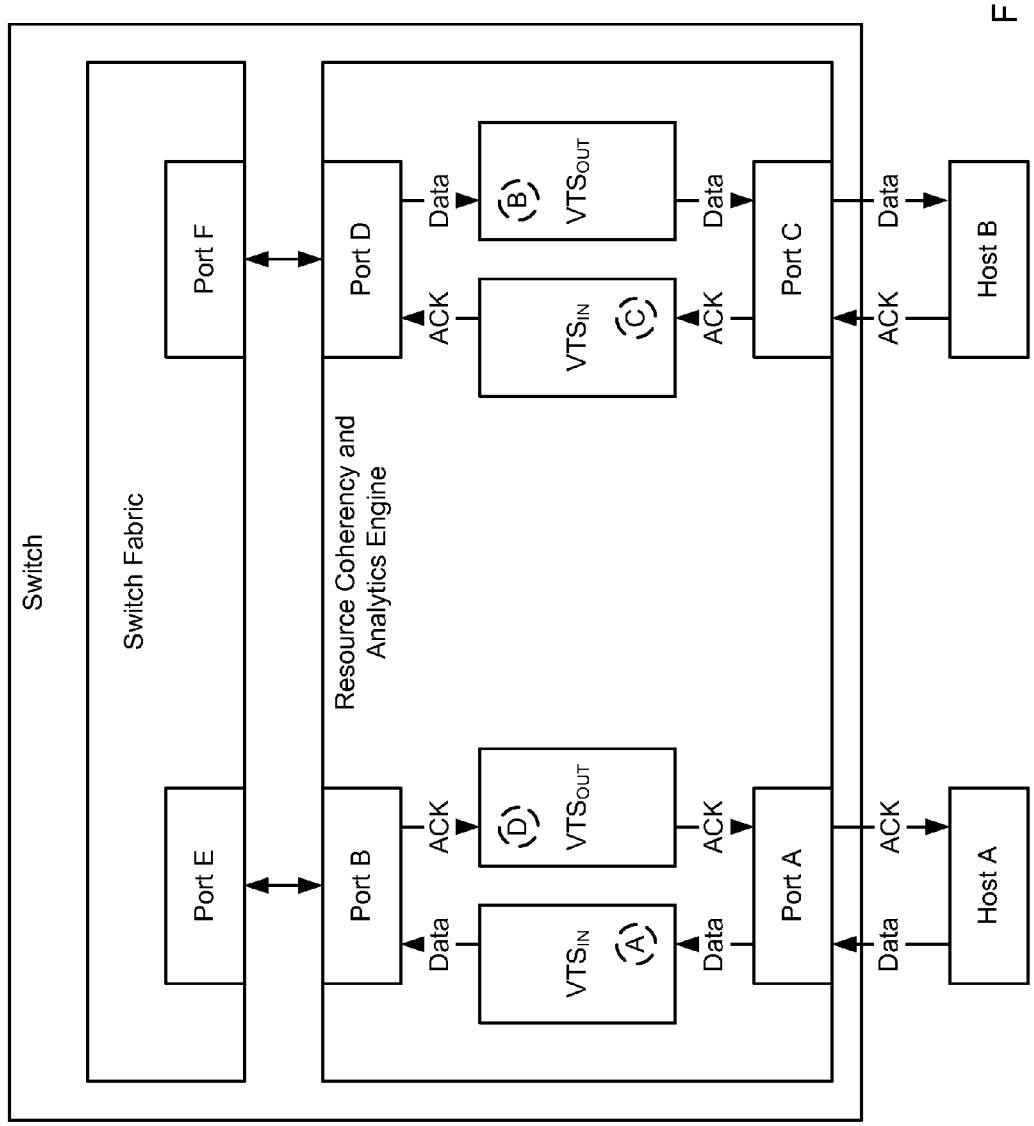
Figure 10B:
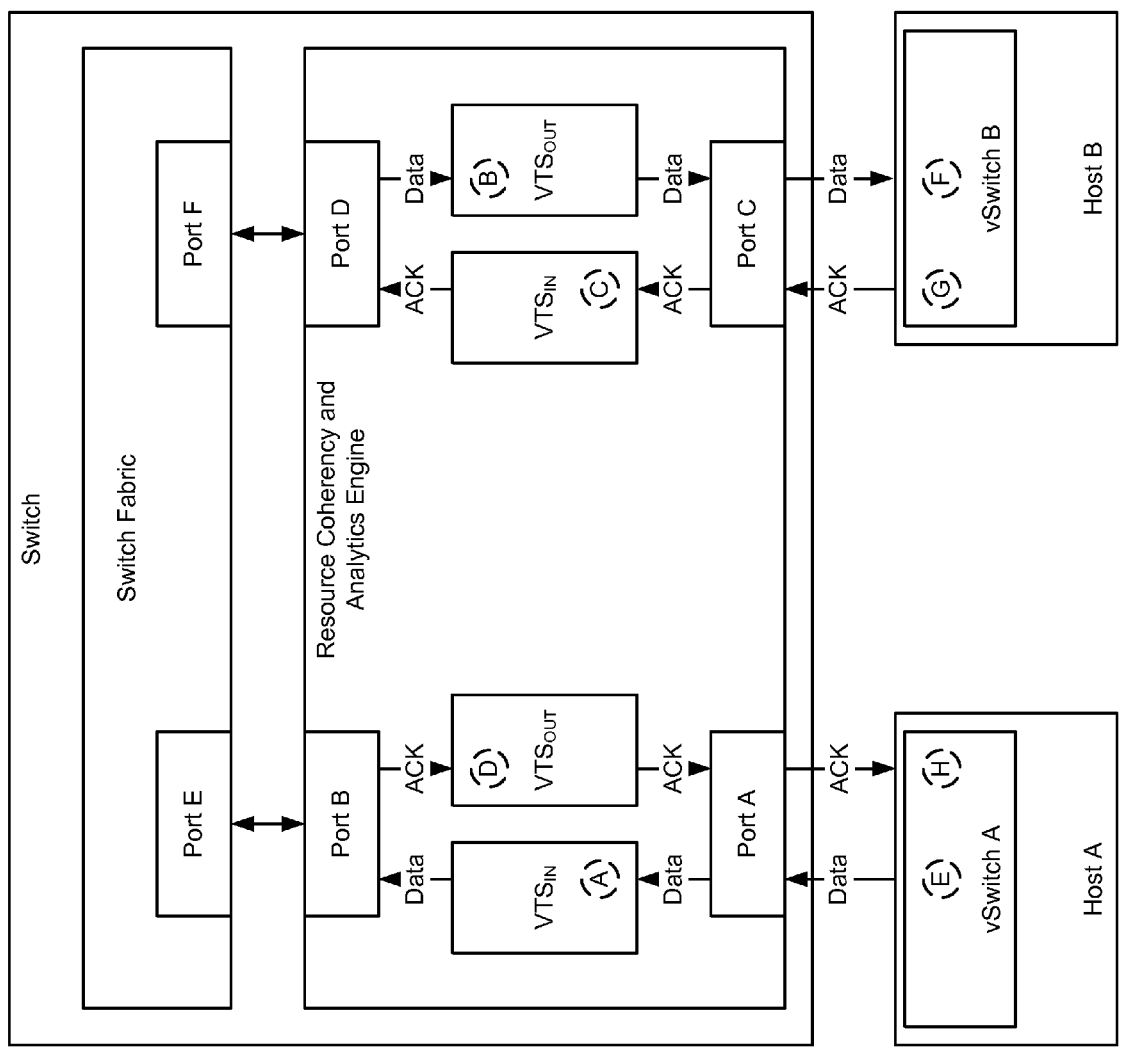

Referring to FIGS. 10A-10B, as described above, each Resource Coherency and Analytics engine (RCAE) is configured to collect RCAE statistics. The RCAE statistics may be used to determine a round-trip delay of packets transmitted through a switch that includes an RCAE. In one or more embodiments of the invention, the RCAE uses the clock on the switch to calculate round-trip delays. The round-trip delay may be determined for both connection and connection-less protocols.

FIG. 10A shows an example for fine-grained traffic analysis of a connection-oriented protocol on a physical network using the RCAE statistics. Referring to FIG. 10A, assume that host A is transmitting data over a TCP connection to host B via the switch. In response to receiving packets, host B sends back ACK packets. The connection between host A and host B is monitored at four locations (A, B, C, D).

In one embodiment of the invention, the classification is performed by a VRG classifier in the VTS. Alternatively, the classification is performed by a classifier located in a port through which the packet is received. In another embodiment, the classification is performed by a classifier interposed between the port and the corresponding VTS.

For all packets matching a particular 5-tuple (e.g., protocol, source/destination IP address, source/destination transport port), the RCAE tracks the following information: (i) at location A, the RCAE tracks the sequence number and the time ($T_A$) (based on the clock in the switch) the packet was received at the ingress port (i.e., Port A in FIG. 10A); (ii) at location B, the RCAE tracks the sequence number and the time ($T_B$) (based on the clock in the switch) the packet was received at the egress port (i.e., Port D in FIG. 10A); (iii) at location C, the RCAE tracks the ACK number and the time ($T_C$) (based on the clock in the switch) the packet was received at the ingress port (i.e., Port C in FIG. 10A); (iv) at location D, the RCAE tracks the ACK number and the time ($T_D$) (based on the clock in the switch) the packet was received at the egress port (i.e., Port B in FIG. 10A).

Using the above information, the RCAE (or a related process) may identify timing information for a given sequence number-ACK number pair. Based on this, the RCAE (or a related process) may determine, for example, one or more of the following: (i) the round-trip delay within switch fabric ($T_{switch} = (T_B - T_A) + (T_D - T_C)$), (ii) the round-trip delay between switch and the destination host for the ACK packet ($T_{dest} = T_C - T_B$), (iii) the total round-trip time for a packet+ACK ($T_{total} = (T_D - T_A)$). Those skilled in the art will appreciate that the above calculations may be performed for connections transmitting data from host B to host A. Further, other calculations may be performed on the collected data without departing from the invention.

Having one or more of the above measurements enables the RCAE (or a related process) to calculate the average (and variance) of the end-to-end time for a given connection, as well as layer 2 segments therein. In one embodiment of the invention, in addition to the timing information for a given connection, the packet rates for the connection may also be determined at each location (e.g., A, B, C, D) which allows the RCAE to provide information related to the throughput and packet drop rates for each layer 2 segment.

In some cases, the layer 2 network may include multiple switches, and hence hops, between communicating hosts. In such cases, measurements may be taken by RCAEs on each switch in the path. This will allow the timing information to obtained per-switch and across multiple switches. In one embodiment of the invention, the host and applications running on the host may continue to execute unchanged while the aforementioned timing information is obtained.

In addition to the above, the RCAE may also track packets based on protocol type and special flags e.g., TCP SYN and FIN, to observe the connection creation time and duration of connection. This information may be used to determine what applications are active on the RCAE.

FIG. 10B shows an example for fine-grained traffic analysis of a connection-oriented protocol on a virtual network using the RCAE statistics. Referring to FIG. 10B, the embodiments shown in FIG. 10A, may be extended to obtain tracking information for connections between virtual machines on different host machines For the purposes of FIG. 10B, assume that host A includes a virtual machine (not shown) connected to vSwtich A and host B includes a virtual machine (not shown) connected to vSwtich B. Further, the two virtual machines communicate with each other using a connection-oriented protocol.

In addition to tracking the timing information at locations A, B, C, D as discussed in FIG. 10A, timing information may also be obtained at locations E, F, G, H. Specifically, for all packets matching a particular 5-tuple, the following information is tracked: (i) at location E, vSwtich A records the sequence number and the time ($T_E$) (based on the clock in host A) the packet was transmitted by the vSwtich A to the switch; (ii) at location F, vSwtich B records the sequence number and the time ($T_F$) (based on the clock in host B) the packet was received by vSwtich B; (iii) at location G, vSwtich B records the ACK number and the time ($T_G$) (based on the clock in host B) the packet was transmitted by vSwtich B to the switch; (iv) at location H, vSwtich B records the ACK number and the time ($T_H$) (based on the clock in host A) the packet was received by vSwtich A.

Using the above information, one or more of the following may be determined: (i) the round-trip delay within switch fabric ($T_{switch} = (T_B - T_A) + (T_D - T_C)$), (ii) the round-trip delay between switch and the destination host for the ACK packet ($T_{dest} = T_C - T_B$), (iii) the total round-trip time for a packet+ACK ($T_{total} = (T_H - T_E)$), (iv) the latency due to the software stack on host B ($T_{stack\_dst} = T_G - T_F$), (v) the latency between vSwitch B and the switch ($T_{vswitch\_dst} = (T_C - T_B) - (T_G - T_F)$), and (vi) the latency between vSwitch A and the switch ($T_{vswitch\_src} = (T_H - T_E) - (T_D - T_A)$). Those skilled in the art will appreciate that the above calculations may be performed for connections transmitting data from a virtual machine on host B to a virtual machine on host A.

In one embodiment of the invention, connection-less protocols such as UDP, do not provide the sequence numbers or ACK numbers which can be utilized for latency analysis. However, the RCAE may track information related to connection-less protocols by sampling every $n^{th}$ packet on well-known ports, which are used by such protocols (e.g., HTTP traffic may be monitored over 80 and SSH traffic may be monitored over port 22). Further, connection-less protocol traffic may monitored on a per application or per host basis. By comparing the packet rates at various locations (such as the locations in FIG. 10A, 10B), the RCAE (or a related process) may infer delays and throughput for connection-less protocols.

In one embodiment of the invention, if the connection-less protocol is UDP, then the vSwitch or the first ingress port of a physical switch may include functionality to modify header information of the packet, thereby marking the packet for tracing. In such cases, the destination vSwtich or the egress port of the final physical switch over which the packets in the connection travel, can remove the earlier made modifications to the header information and, optionally, generate a timing packet (i.e., a packet that is equivalent to an ACK packet in connection-oriented protocols) back to the source of the original packet. In such a scenario, the RCAE may track such packets in the same manner as packets sent using connection-oriented protocol as described above in FIGS. 10A-10B.

Figure 11A:
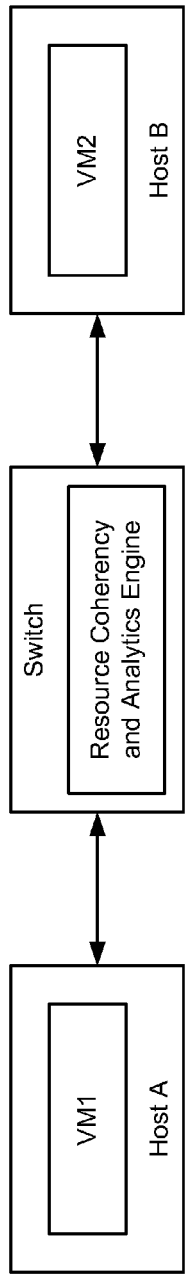
Figure 11B:
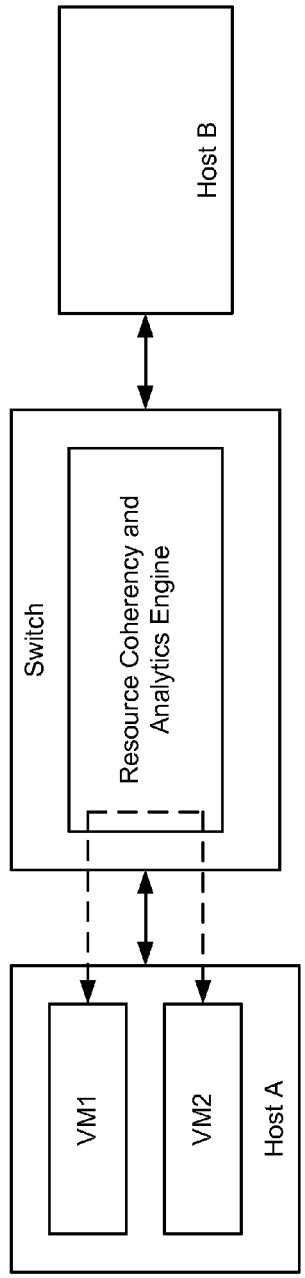
Figure 11C:
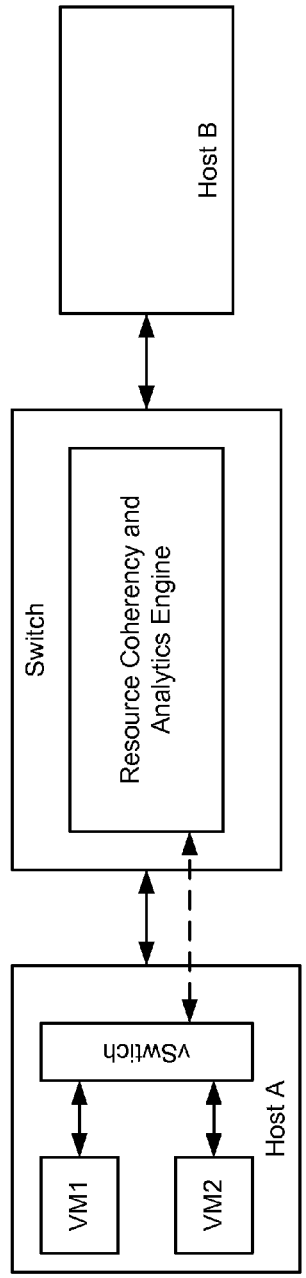

FIGS. 11A-11C show an example of migrating virtual machines in a VRG in accordance with one or more embodiments of the invention. Referring to FIG. 11A, assume that the VM1 and VM2 belong to the same VRG and that the data transferred between them exceeds a pre-defined threshold or that a latency of packets transferred between the VMs has exceeded a pre-defined threshold. The RCAE upon making this determination using, for example, RCAE statistics (defined above), may attempt to co-locate the two VMs on a single host. Once a determination is made that such a host exists, then one or both VMs (as necessary) may be migrated the identified host. Following the migration, the RCAE may determine how to continue to manage and monitor the packets communicated between the two VMs in a manner that satisfies the VRCL associated with the VRG. FIGS. 11B and 11C show two different embodiments of how the RCAE may manage and monitor the packets communicated between the two VMs. Those skilled in the art will appreciate that other metrics obtained from the RCAE statistics may be used to initiate a migration of VMs without departing from the invention.

Referring to FIG. 11B, VM2 is migrated to host A from host B, thereby co-locating both VMs on host A. In this embodiment, all packets communicated between the VMs pass through the RCAE. For example, for VM1 to send a packet to VM2, the packet must be issued from VM1 to the switch. Upon receipt by the switch the packet is processed by the RCAE and then, as appropriate, sent to back to VM2. In this embodiment, the RCAE is directly involved in monitoring and managing packets communicated between the VMs.

Referring to FIG. 11C, VM2 is migrated to host A from host B, thereby co-locating both VMs on host A. In this embodiment, packets communicated between VM1 and VM2 are communicated over a vSwitch on host A. Accordingly, the RCAE does not directly monitor or manage packets communicated between the VMs. However, the RCAE provides various control parameters to the vSwitch based on the VRCL associated with VRG to which the VMs belong. In various embodiments of the invention, the vSwitch implements the control parameters, for example, bandwidth limits between the VMs. Further, the vSwitch may also provide information that is equivalent to the RCAE statistics collected by the RCAE. This information may be used by the RCAE as it continues to monitor and manage the packets communicated between elements within the VRG.

Those skilled in the art will appreciate that while FIGS. 8A-11C showed RCAEs implemented in switches, the RCAE may be implemented in any network device without departing from the invention.

One or more embodiments of the invention may be implemented, at least in part, using software instructions. In such embodiments, the software instructions may be recorded (or otherwise stored) on any tangible non-transitory medium (e.g., random access memory (RAM), flash memory, compact disc (CD), a diskette, a tape, memory, or any other tangible computer readable storage).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
a switch fabric comprising a plurality of output ports (OPs); and
a resource coherency and analytics engine (RCAE) that includes:
a plurality of input ports each configured to receive packets;
a plurality of virtual traffic shapers (VTSs) each associated with one of the plurality of input ports, wherein each of the plurality of VTSs comprises a plurality of virtual output queues (VOQs) and a plurality of virtualizable resource groups (VRG), wherein each VOQ is associated with a VRG-OP pair for an OP from the plurality of OPs and a VRG from the plurality of VRGs;
a vResource Snooper configured to obtain RCAE statistics from each of the plurality of VTSs;
a vCoherency Controller configured to obtain the RCAE statistics from the vResource Snooper and set VTS operating parameters based on the RCAE statistics; and
a vResource Policy Feedback Module configured to obtain the VTS operating parameters from the vCoherency controller and provide the VTS operating parameters to at least one of the plurality of VTSs,
wherein a first VRG of the plurality of VRGs is associated with a first virtual network comprising a first virtual machine located on a first host and a second virtual machine located on a second host, wherein the RCAE is configured to initiate a migration of the second virtual machine to the first host when a latency for packets communicated between the first virtual machine and the second virtual machine exceeds a predetermined threshold.

2. A system, comprising:
a switch fabric comprising a plurality of output ports (OPs); and
a resource coherency and analytics engine (RCAE) comprising a virtual traffic shaper (VTS), wherein the RCAE is operatively connected to the switch fabric, wherein the VTS comprises a plurality of virtual output queues (VOQs), wherein each VOQ is associated with a virtualizable resource group (VRG)-OP pair, wherein each OP is one of the plurality of OPs and wherein each VRG is one of a plurality of VRGs, wherein the VTS is configured to:
receive a first packet,
make a first determination that the first packet is to be sent to a first OP of the plurality of OPs,
make a second determination that the first packet is associated with a first VRG of a plurality of VRGs,
store, based on the first and second determinations, the first packet in a VOQ associated with a first VRG-OP pair corresponding to the first VRG and the first OP, wherein the VOQ is one of the plurality of VOQs, and
schedule the first packet for transmission from the VOQ to the switch fabric, wherein the VTS is further configured to:
receive a second packet,
make a third determination that the second packet is to be sent to a second OP of the plurality of OPs,
make a fourth determination that the second packet is associated with a second VRG,
obtain a second VRCL associated with the second VRG, wherein the second VRCL further specifies a cut-through policy for the second VRG, and
schedule the second packet for transmission to the switch fabric without storing the second packet in any of the plurality of VOQs based on the cut-through policy.

3. The system of claim 2, wherein each VRCL further specifies at least one of a guaranteed bandwidth for the VRG, or a maximum latency for the VRG.

4. A system, comprising:
a switch fabric comprising a plurality of output ports (OPs); and
a resource coherency and analytics engine (RCAE) comprising a virtual traffic shaper (VTS), wherein the RCAE is operatively connected to the switch fabric, wherein the VTS comprises a plurality of virtual output queues (VOQs), wherein each VOQ is associated with a virtualizable resource group (VRG)-OP pair, wherein each OP is one of the plurality of OPs and wherein each VRG is one of a plurality of VRGs, wherein the VTS is configured to:
receive a first packet,
make a first determination that the first packet is to be sent to a first OP of the plurality of OPs,
make a second determination that the first packet is associated with a first VRG of a plurality of VRGs,
store, based on the first and second determinations, the first packet in a VOQ associated with a first VRG-OP pair corresponding to the first VRG and the first OP,
wherein the VOQ is one of the plurality of VOQs, and
schedule the first packet for transmission from the VOQ to the switch fabric, wherein the VTS is further configured to:
receive a second packet,
make a third determination that the second packet is to be sent to a second OP of the plurality of OPs,
make a fourth determination that the second packet is associated with the first VRG,
store, based on the third and fourth determinations, the second packet in a second VOQ associated with a second VRG-OP pair corresponding to the first VRG and the second OP, and
schedule the second packet for transmission from the second VOQ to the switch fabric.

5. The system of claim 4, wherein the first packet is scheduled for transmission based on a first drain rate, wherein the second packet is scheduled for transmission based on a second drain rate, wherein the first drain rate is different than the second drain rate.

6. A system, comprising:
a switch fabric comprising a plurality of output ports (OPs); and
a resource coherency and analytics engine (RCAE) comprising a virtual traffic shaper (VTS), wherein the RCAE is operatively connected to the switch fabric, wherein the VTS comprises a plurality of virtual output queues (VOQs), wherein each VOQ is associated with a virtualizable resource group (VRG)-OP pair, wherein each OP is one of the plurality of OPs and wherein each VRG is one of a plurality of VRGs, wherein the VTS is configured to:
receive a first packet,
make a first determination that the first packet is to be sent to a first OP of the plurality of OPs,
make a second determination that the first packet is associated with a first VRG of a plurality of VRGs,
store, based on the first and second determinations, the first packet in a VOQ associated with a first VRG-OP pair corresponding to the first VRG and the first OP, wherein the VOQ is one of the plurality of VOQs, and
schedule the first packet for transmission from the VOQ to the switch fabric, wherein the VTS is further configured to:
receive a second packet,
make a third determination that the second packet is to be sent to the first OP,
make a fourth determination that the second packet is associated with a second VRG,
store, based on the third and fourth determinations, the second packet in a second VOQ associated with a second VRG-OP pair corresponding to the second VRG and the first OP, and
schedule the second packet for transmission from the second VOQ to the switch fabric, wherein the first packet is scheduled for transmission based on a first drain rate, wherein the second packet is scheduled for transmission based on a second drain rate, wherein the first drain rate is different than the second drain rate.

7. The system of claim 6, wherein the VTS comprises a VOQ drainer, wherein the VOQ drainer is associated with a drain rate, wherein the drain rate specifies a rate at which packets in the VOQ are scheduled for transmission to the switch fabric, and wherein the VOQ drainer is configured to schedule the first packet for transmission based on the drain rate.

8. The system of claim 6, wherein the VTS comprises a VTS snooper configured to obtain RCAE statistics for the VTS, wherein the RCAE statistics comprises at least one selected from a group consisting of a number of packets received, number of packets scheduled for transmission to the switch fabric, and latency of packets in the VTS.

9. The system of claim 6, wherein the VOQ is a buffer.

10. The system of claim 6, wherein the VRG further includes at least one from a network flow or another VRG.

11. The system of claim 6, wherein the VRG further includes at least one selected from a group consisting of a media access control address, or a virtual local area network (VLAN) tag, or a transmission control protocol (TCP) flow, or a user datagram protocol (UDP) flow, or an internet control message protocol (ICMP) flow, or a 802.11q tag.

12. A network device, comprising:
a switch fabric comprising a plurality of output ports (OPs); and
a resource coherency and analytics engine (RCAE) comprising:
a plurality of input ports each configured to receive packets,
a plurality of virtual traffic shapers (VTSs) each associated with one of the plurality of input ports, wherein each of the plurality of VTSs comprises a plurality of virtual output queues (VOQs) and a plurality of virtualizable resource groups (VRG), wherein each VOQ is associated with a VRG-OP pair for an OP from the plurality of OPs and a VRG from the plurality of VRGs, wherein at least one of the plurality of VRGs is associated with one or more virtual networks,
a vResource Snooper configured to obtain RCAE statistics from each of the plurality of VTSs,
a vCoherency Controller configured to obtain the RCAE statistics from the vResource Snooper and set VTS operating parameters based on the RCAE statistics, and
a vResource Policy Feedback Module configured to obtain the VTS operating parameters from the vCoherency controller and provide the VTS operating parameters to at least one of the plurality of VTSs, wherein a first VRG of the plurality of VRGs is associated with a first virtual network comprising a first virtual machine located on a first host and a second virtual machine located on a second host, wherein the RCAE is configured to initiate a migration of the second virtual machine to the first host when a latency for packets communicated between the first virtual machine and the second virtual machine exceeds a pre-determined threshold.

13. The network device of claim 12, wherein a first VRG of the plurality of VRGs is associated with a first virtual network and a second virtual network, and wherein a second VRG of the plurality of VRGs is associated with a third virtual network.

14. The network device of claim 12, wherein the virtual network comprises at least one physical network entity.

15. The network device of claim 12, wherein the RCAE is further configured to:
determine a round-trip delay for packets transmitted through the switch fabric, wherein the round-trip delay is determined using a clock in the network device.

16. The network device of claim 15, wherein the packets are transmitted using a connection-less protocol.

17. The network device of claim 15, wherein the network device is one selected from a group consisting of a single-layer switch, a multi-layer switch, and a router.

18. The network device of claim 15, wherein the packets are transmitted using a connection-oriented protocol.

19. A network device, comprising:
a switch fabric comprising a plurality of output ports (OPs); and
a resource coherency and analytics engine (RCAE) comprising:
a first input port;
a first Virtual Traffic Shaper (VTS) comprising:
a first virtual output queue (VOQ) associated with a first virtualizable resource group (VRG)-OP pair corresponding to a first VRG and a first OP, wherein the first VOQ is configured to receive packets from the first input port; and
a first VOQ drainer is associated with a first drain rate, wherein the first drain rate specifies a rate at which packets in the first VOQ are scheduled for transmission to the switch fabric, and wherein the first VOQ drainer is configured to schedule a first packet in the first VOQ for transmission based on the first drain rate;
a vCoherency Controller configured to obtain RCAE statistics from the first VTS and update the first drain rate to obtain an updated first drain rate using the RCAE statistics obtained from the first VTS, wherein the RCAE is configured to provide the first VOQ drainer with the updated first drain rate;
a second input port; and a second VTS comprising:
- a second virtual output queue (VOQ) associated with a second VRG-OP pair corresponding to a first VRG and a second OP, wherein the second VOQ is configured to receive packets from the second input port; and
- a second VOQ drainer is associated with a second drain rate, wherein the second drain rate specifies a rate at which packets in the second VOQ are scheduled for transmission to the switch fabric, and wherein the second VOQ drainer is configured to schedule a second packet in the second VOQ for transmission based on the second drain rate, wherein the vCoherency Controller is further configured to obtain RCAE statistics from the second VTS and update the second drain rate to obtain an updated second drain rate based on the RCAE statistics obtained from first VTS and the RCAE statistics obtained from the second VTS, wherein the RCAE is further configured to provide the second VOQ drainer with the updated second drain rate.

20. The network device of claim 19, wherein the vCoherency Controller obtains the RCAE statistics for the first VTS directly from the first VTS.

21. The network device of claim 19, wherein the RCAE statistics comprise a number of packets scheduled for transmission by the first VOQ drainer.

* * * * *